United States Patent
Yamazaki

(10) Patent No.: US 9,520,929 B2
(45) Date of Patent: Dec. 13, 2016

(54) COMMUNICATION CONTROL METHOD, USER TERMINAL, AND BASE STATION

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

(*) Notice: Subject to any disclaimer, the term of this patent is extended or adjusted under 35 U.S.C. 154(b) by 63 days.

(21) Appl. No.: 14/381,078

(22) PCT Filed: Feb. 27, 2013

(86) PCT No.: PCT/JP2013/055198
§ 371 (c)(1),
(2) Date: Aug. 26, 2014

(87) PCT Pub. No.: WO2013/129502
PCT Pub. Date: Sep. 6, 2013

(65) Prior Publication Data
US 2015/0043463 A1  Feb. 12, 2015

Related U.S. Application Data

(60) Provisional application No. 61/604,673, filed on Feb. 29, 2012, provisional application No. 61/713,783, filed on Oct. 15, 2012.

(51) Int. Cl.
*H04B 7/06* (2006.01)
*H04W 16/28* (2009.01)
(Continued)

(52) U.S. Cl.
CPC .......... *H04B 7/0632* (2013.01); *H04B 7/0452* (2013.01); *H04B 7/0478* (2013.01); *H04W 16/28* (2013.01); *H04W 28/16* (2013.01)

(58) Field of Classification Search
CPC .................................................. H04B 7/0632
(Continued)

(56) References Cited

U.S. PATENT DOCUMENTS 8,406,171 B2 * 3/2013 Onggosanusi ......... H04B 7/024
370/328
8,442,143 B2  5/2013 Lee et al.
(Continued)

FOREIGN PATENT DOCUMENTS

EP  2175573 A1  4/2010
JP  2009-089188 A  4/2009
(Continued)

OTHER PUBLICATIONS

The extended European search report issued by the European Patent Office on Jun. 29, 2015, which corresponds to European Patent Application No. 13754520.8-1852 and is related to U.S. Appl. No. 14/381,078.
(Continued)

*Primary Examiner* — Andrew Lai
*Assistant Examiner* — Andrew C Lee
(74) *Attorney, Agent, or Firm* — Studebaker & Brackett PC

(57) ABSTRACT

A communication control method is applied to a mobile communication system including a base station that transmits a downlink signal through a plurality of antenna ports, and a user terminal that feeds back precoder matrix information to the base station, the downlink signal being precoded using a precoder matrix, the precoder matrix information indicating a precoder matrix preferred to be used in a downlink. The communication control method comprises: a step A of notifying, by the user terminal, the base station of antenna port information indicating an antenna port with low degree of contribution at a time of transmission from the (Continued)

base station when the precoder matrix information is fed back to the base station.

25 Claims, 17 Drawing Sheets

(51) Int. Cl.
*H04W 28/16* (2009.01)
*H04B 7/04* (2006.01)

(58) Field of Classification Search
USPC .................. 370/329, 280, 328, 335, 344
See application file for complete search history.

(56) References Cited

U.S. PATENT DOCUMENTS

| | | | | |
|---|---|---|---|---|
| 8,514,826 B2* | 8/2013 | Han | ............... | H04L 5/0053 370/252 |
| 8,520,494 B2* | 8/2013 | Yang | ............... | H04L 5/0023 370/204 |
| 8,594,036 B2* | 11/2013 | Kang | ............... | H04B 7/0434 370/329 |
| 8,625,450 B2* | 1/2014 | Lunttila | ............... | H04B 7/0626 370/224 |
| 8,676,133 B2* | 3/2014 | Montojo | ............... | H04B 7/061 370/208 |
| 8,687,555 B2* | 4/2014 | Ko | ............... | H04L 1/0026 370/328 |
| 8,750,205 B2* | 6/2014 | Chen | ............... | H04B 7/024 370/328 |
| 8,787,261 B2 | 7/2014 | Taoka et al. | | |
| 9,166,758 B2* | 10/2015 | Lee | ............... | H04L 5/0053 |
| 2008/0170523 A1 | 7/2008 | Han et al. | | |
| 2008/0318606 A1 | 12/2008 | Tsutsui et al. | | |
| 2010/0069122 A1 | 3/2010 | Ito | | |
| 2010/0296463 A1 | 11/2010 | Taoka et al. | | |
| 2011/0034192 A1 | 2/2011 | Lim et al. | | |
| 2011/0085507 A1* | 4/2011 | Jongren | ............... | H04B 7/0413 370/329 |
| 2011/0128917 A1* | 6/2011 | Ko | ............... | H04B 7/0413 370/328 |
| 2011/0135033 A1* | 6/2011 | Ko | ............... | H04B 7/0413 375/295 |
| 2011/0200127 A1 | 8/2011 | Lee et al. | | |
| 2012/0045018 A1 | 2/2012 | Zhou et al. | | |
| 2012/0045218 A1 | 2/2012 | Sugawara et al. | | |
| 2012/0063494 A1* | 3/2012 | Frenne | ............... | H04B 7/0417 375/219 |
| 2012/0195264 A1 | 8/2012 | Taoka et al. | | |
| 2012/0257592 A1 | 10/2012 | Taoka et al. | | |
| 2013/0279403 A1 | 10/2013 | Takaoka et al. | | |

FOREIGN PATENT DOCUMENTS

| | | |
|---|---|---|
| JP | 2010-068496 A | 3/2010 |
| JP | 2011-082705 A | 4/2011 |
| JP | 2011-518478 A | 6/2011 |
| JP | 2011-166714 A | 8/2011 |
| WO | 20101135924 A1 | 12/2010 |
| WO | 2011/083774 A1 | 7/2011 |

OTHER PUBLICATIONS

Communication pursuant to Rules 70(2) and 70a(2) EPC issued by the European Patent Office on Jul. 16, 2015, which corresponds to European Patent Application No. 13754520.8-1852 and is related to U.S. Appl. No. 14/381,078.
Office Action issued by the Japanese Patent Office on Sep. 1, 2015, which corresponds to Japanese Patent Application No. 2014-502323 and is related to U.S. Appl. No. 14/381,078 with a Statement of Relevance of Non-English References.
International Search Report; PCT/JP2013/055198; Jun. 4, 2013.
3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).
EP Office Action dated Aug. 22, 2016 from corresponding EP Appl No. 13 754 520.8—1874, 5 pp.
An Office Action; "Notice of Reasons for Rejection," issued by the Japanese Patent Office on Oct. 25, 2016, which corresponds to Japanese Patent Application No. 2015-249911 and is related to U.S. Appl. No. 14/381,078; with English language statement of relevance.

* cited by examiner

COMMUNICATION CONTROL METHOD, USER TERMINAL, AND BASE STATION

TECHNICAL FIELD

The present invention relates to a communication control method, a user terminal, and a base station, which deal with precoder matrix information.

BACKGROUND ART

3GPP (3rd Generation Partnership Project), which is a project aiming to standardize a mobile communication system, supports a multi-antenna transmission technology, in which a base station directs a beam toward a specific user terminal while directing a null toward another user terminal (see, for example, Non Patent Document 1).

In order to realize such a multi-antenna transmission technology using an FDD scheme, each of a plurality of user terminals feeds back precoder matrix information, which indicates a precoder matrix preferred to be used in a downlink, to a base station.

The base station precodes a downlink signal using the precoder matrix based on the precoder matrix information fed back from each user terminal. Then, the base station transmits the precoded downlink signal through a plurality of antenna ports (a plurality of feeding points). The precoder matrix includes a plurality of precoder matrix elements (a plurality of weights) corresponding to the plurality of antenna ports.

PRIOR ART DOCUMENT

Non-Patent Document

Non-patent Document 1: 3GPP technology specifications "TS 36.300 V11.0.0" December, 2011

SUMMARY OF THE INVENTION

However, when the base station receives plural pieces of precoder matrix information fed back from a plurality of user terminals, if precoder matrix information corresponding to a certain user terminal is used, there is a problem that it is difficult to appropriately direct a beam/a null toward a different user terminal from the certain user terminal.

Therefore, an object of the present invention is to provide a communication control method with which a base station is able to appropriately direct a beam/a null toward a plurality of user terminals, a user terminal therefor, and a base station therefor.

In order solve the problems described above, the present invention includes following features.

A communication control method of the present invention is a method applied to a mobile communication system including a base station that transmits a downlink signal through a plurality of antenna ports, and a user terminal that feeds back precoder matrix information to the base station, the downlink signal being precoded using a precoder matrix, the precoder matrix information indicating a precoder matrix preferred to be used in a downlink. The communication control method comprises: a step A of notifying, by the user terminal, the base station of antenna port information indicating an antenna port with low degree of contribution at a time of transmission from the base station when the precoder matrix information is fed back to the base station.

The communication control method may further comprises: a step B of instructing, by the base station, the user terminal to notify the antenna port information, wherein in the step A, the user terminal notifies the base station of the antenna port information based on an instruction from the base station in the step B.

The number of antenna ports selectable as the antenna port with low degree of contribution may be determined based on the number of antenna ports of the base station.

The antenna port with low degree of contribution may be determined based on received power of each downlink reference signal that is received by the user terminal from the base station for each of the plurality of antenna ports.

The communication control method may further comprises: a step C of feeding back, by the user terminal, channel quality information to the base station, the channel quality information indicating a modulation scheme and coding rate preferred to be used in a downlink, wherein the step C comprises: a step of correcting the channel quality information to be fed back to the base station when the user terminal notifies the base station of the antenna port information in the step A.

The communication control method may further comprises: a step D of notifying, by the base station, the user terminal of transmission precoder matrix information indicating a precoder matrix used when the base station transmits a downlink signal, wherein in the step D, the transmission precoder matrix information to be transmitted to the user terminal is determined on the basis of the precoder matrix information received by the base station from the user terminal.

The precoder matrix information may indicate a precoder matrix in which a beam is directed toward the user terminal.

The precoder matrix information may indicate a precoder matrix in which a null is directed toward the user terminal.

A user terminal of the present invention is a user terminal which feeds back precoder matrix information to a base station that transmits a downlink signal through a plurality of antenna ports, the precoder matrix information indicating a precoder matrix preferred to be used in a downlink, the downlink signal being precoded using a precoder matrix. The user terminal comprises: notification unit that notifies the base station of antenna port information indicating an antenna port with low degree of contribution at a time of transmission from the base station when the precoder matrix information is fed back to the base station.

A base station of the present invention is a base station which transmits a downlink signal through a plurality of antenna ports, the downlink signal being precoded using a precoder matrix. The base station comprises: reception unit that receives precoder matrix information fed back from the user terminal, wherein the reception unit receives antenna port information notified from the user terminal when receiving the precoder matrix information, the precoder matrix information indicates a precoder matrix preferred to be used in a downlink, and the antenna port information indicates an antenna port with low degree of contribution at a time of transmission from the base station.

A mobile communication system of the present invention is a system comprising a base station that performs downlink transmission by applying a precoder matrix for determining downlink transmission directionality; and a user terminal that feeds back plural pieces of precoder matrix information corresponding to one frequency band to the base station.

Each of the plural pieces of precoder matrix information may be used in order to determine the precoder matrix to be applied to downlink transmission to the user terminal, and indicates the precoder matrix preferred to the user terminal. Here, the precoder matrix preferred to the user terminal includes the precoder matrix in which a beam is directed toward the user terminal.

The plural pieces of precoder matrix information may include the most preferred n (n≥2) pieces of precoder matrix information. Here, a value of the n may be directed from the base station.

The user terminal further feeds back channel quality information to the base station, the channel quality information indicating a modulation scheme and coding rate preferred to be used in a downlink, and the user terminal may feed back plural pieces of channel quality information corresponding to the plural pieces of precoder matrix information to the base station.

The user terminal further feeds back channel quality information to the base station, the channel quality information indicating a modulation scheme and coding rate preferred to be used in a downlink, and the user terminal may feed back one piece of channel quality information to the base station even when feeding back the plural pieces of precoder matrix information with respect to the one frequency band. Here, the one piece of channel quality information may be determined based on least preferred precoder matrix information among the plural pieces of precoder matrix information.

Each of the plural pieces of precoder matrix information may be used in order to determine the precoder matrix to be applied to downlink transmission to a different user terminal from the user terminal, and indicates the precoder matrix preferred to the user terminal. Here, the precoder matrix preferred to the user terminal may include the precoder matrix in which a null is directed toward the user terminal.

The plural pieces of precoder matrix information may include the most preferred n (n≥2) pieces of precoder matrix information. Here, a value of the n may be directed from the base station.

Each of the plural pieces of precoder matrix information may be used in order to determine the precoder matrix to be applied to downlink transmission to a different user terminal from the user terminal, and indicates the precoder matrix not preferred to the user terminal. Here, the precoder matrix not preferred to the user terminal may include the precoder matrix in which a beam is directed toward the user terminal.

The plural pieces of precoder matrix information may include the least preferred n (n≥2) pieces of precoder matrix information. Here, a value of the n may be directed from the base station.

The base station may configure a serving cell of the user terminal or a cell adjacent to the serving cell.

A user terminal of the present invention is a user terminal in a mobile communication system and comprises: a control unit that feeds back plural pieces of precoder matrix information corresponding to one frequency band to a base station that performs downlink transmission by applying a precoder matrix for determining downlink transmission directionality.

A base station of the present invention is a base station which performs downlink transmission by applying a precoder matrix for determining downlink transmission directionality in a mobile communication system. The base station comprises: a reception unit that receives plural pieces of precoder matrix information fed back from a user terminal and corresponding to one frequency band.

DESCRIPTION OF THE EMBODIMENTS

Figure 1:
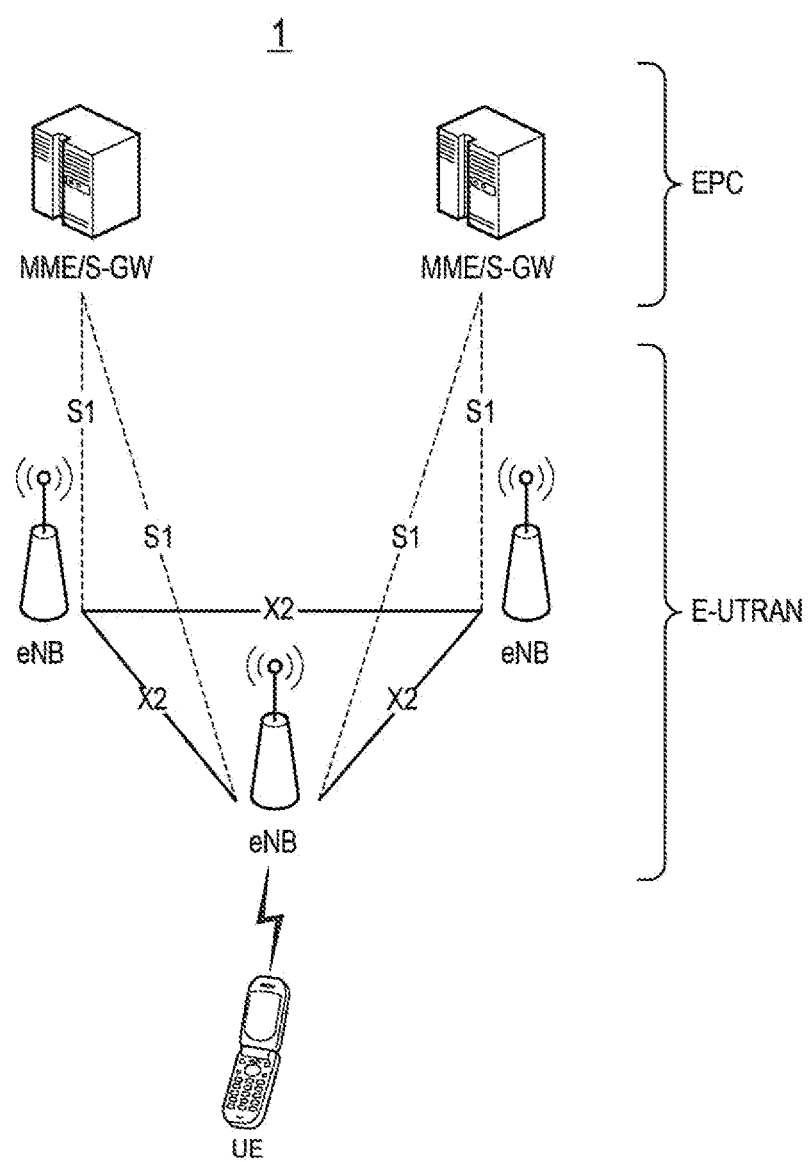
FIG. 1 is a configuration diagram of an LTE system according to a first embodiment to a fourth embodiment.

Hereinafter, embodiments of the present invention will be described with reference to the accompanying drawings. Note that in the following drawing according to the embodiments, identical or similar symbols are assigned to identical or similar portions.

Overview of Embodiments

A communication control method according to an embodiment is applied to a mobile communication system including a base station that transmits a downlink signal precoded using a precoder matrix through a plurality of antenna ports, and a user terminal that feeds back precoder matrix information, which indicates a precoder matrix preferred to be used in a downlink, to the base station. The communication control method includes a step of notifying, by the user terminal, the base station of antenna port information indicating an antenna port with low degree of contribution at a time of transmission from the base station when the precoder matrix information is fed back to the base station. In this way, the base station is able to recognize the antenna port with low degree of contribution at a time of transmission to the user terminal. Thus, the base station, for example, is able to change a precoder matrix element (a weight), which corresponds to the antenna port with low degree of contribution in a precoder matrix that is used in the transmission of a downlink signal to the user terminal, for the sake of another user terminal. Consequently, it is possible to appropriately direct a beam/a null toward the other user terminal.

Alternatively, the mobile communication system according to the embodiment includes a base station that performs downlink transmission by applying a precoder matrix for determining downlink transmission directionality, and a user terminal that feeds back plural pieces of precoder matrix information corresponding to one frequency band to the base station.

Each of the plural pieces of precoder matrix information is used in order to determine the precoder matrix to be applied to downlink transmission to the user terminal, and indicates the precoder matrix preferred to the user terminal. Such precoder matrix information is called "PMI". In this way, the base station is able to recognize the plural pieces of precoder matrix information available for downlink transmission to the user terminal, so that it is possible to appropriately direct a beam toward the user terminal while considering another user terminal.

Alternatively, each of the plural pieces of precoder matrix information is used in order to determine the precoder matrix to be applied to downlink transmission to a user terminal (another user terminal) other than the user terminal, and indicates the precoder matrix preferred to the user terminal. Furthermore, the precoder matrix preferred to the user terminal includes the precoder matrix in which a null is directed toward the user terminal. Such precoder matrix information is called "Best Companion PMI (BC-PMI)".

For example, when the other user terminal feeds back PMI coinciding with BC-PMI from the user terminal, the base station assigns a radio resource, which is equal to that assigned to the user terminal, to the other user terminal, and applies the PMI coinciding with the BC-PMI to downlink transmission to the other user terminal. Furthermore, a plurality of BC-PMIs are fed back, so that it is possible to reduce limitation for scheduling while holding a large interference suppression effect.

Alternatively, each of the plural pieces of precoder matrix information is used in order to determine the precoder matrix to be applied to downlink transmission to a user terminal (another user terminal) other than the user terminal, and indicates the precoder matrix not preferred to the user terminal. Furthermore, the precoder matrix not preferred to the user terminal includes the precoder matrix in which a beam is directed toward the user terminal. Such precoder matrix information is called "Worst Companion PMI (WC-PMI)".

For example, when the other user terminal feeds back PMI not coinciding with WC-PMI from the user terminal, the base station assigns a radio resource, which is equal to that assigned to the user terminal, to the other user terminal, and applies the PMI not coinciding with WC-PMI to downlink transmission to the other user terminal. Furthermore, a plurality of WC-PMIs are fed back, so that it is possible to improve an interference suppression effect with substantially no change in the limitation for scheduling.

First Embodiment

Hereinafter, a first embodiment will be described. The first embodiment is an embodiment in which the present invention is applied to MU (Multi-User)-MIMO (Multiple Input Multiple Output) in an LTE system.

(1) Overview of LTE System

First, the overview of an LTE system will be described. FIG. 1 is a configuration diagram of the LTE system.

As illustrated in FIG. 1, an LTE system 1 includes UE (User Equipment), E-UTRAN (Evolved-UMTS Terrestrial Radio Access Network), and EPC (Evolved Packet Core).

The UE is a mobile radio communication device and corresponds to a user terminal. The UE is a mobile radio communication device, and performs radio communication with a cell (called a "serving cell"), which established a connection, in a connected state corresponding to a state during a connection.

The E-UTRAN includes a plurality of eNBs (evolved Node-B). The eNB is a stationary radio communication device that performs radio communication with the UE, and corresponds to a base station. Each eNB configures one cell or a plurality of cells. The eNB, for example, has a radio resource management (RRM) function, a routing function of user data, and a measurement control function for mobility control and scheduling.

The EPC includes MME (Mobility Management Entity) and S-GW (Serving-Gateway). The EPC corresponds to a core network. The MME is a network entity that performs various types of mobility control and the like for the UE, and corresponds to a control station. The S-GW is a network entity that performs transmission control of user data, and corresponds to a switching center.

The eNBs are connected to one another through an X2 interface. Furthermore, the eNBs are connected to the MME and the S-GW through S1 interfaces.

Figure 2:
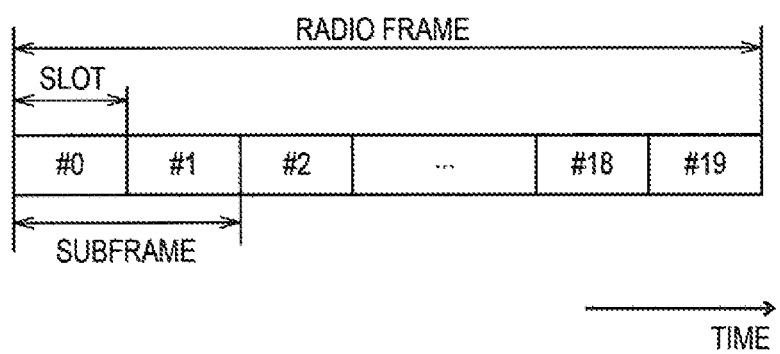
FIG. 2 is a configuration diagram of a radio frame used in the LTE system according to the first embodiment to the fourth embodiment.

FIG. 2 is a configuration diagram of a radio frame used in the LTE system 1. The LTE system 1 employs OFDMA (Orthogonal Frequency Division Multiplexing Access) in a downlink (DL) and SC-FDMA (Single Carrier Frequency Division Multiple Access) in an uplink (UL).

As illustrated in FIG. 2, the radio frame includes 10 subframes arranged in a time direction, wherein each subframe includes two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes 12 continuous subcarriers and configures one unit when a frequency and time resource is assigned to the UE. Each symbol is provided at a head thereof with a guard interval called a cyclic prefix (CP).

In the downlink, an interval of several symbols at the head of each subframe is a control region mainly used as a physical downlink control channel (PDCCH). Furthermore, a remaining interval of each subframe is a data region mainly used as a physical downlink shared channel (PDSCH).

The PDCCH carries a control signal. The control signal, for example, includes uplink SI (Scheduling Information), downlink SI, and a TPC bit. The uplink SI indicates the assignment of an uplink frequency and time resource and the downlink SI indicates the assignment of a downlink frequency and time resource. The TPC bit is a signal for instructing increase or decrease in uplink transmission power.

The PDSCH carries a control signal and/or user data. For example, a downlink data region may be assigned only to the user data, or assigned such that the user data and the control signal are multiplexed.

Furthermore, acknowledgement (ACK)/nonacknowledgement (NACK) is carried through a physical HARQ indicator channel (PHICH). The ACK/NACK indicates whether decoding of a signal transmitted through an uplink physical channel (for example, PUSCH) is succeeded.

In the uplink (UL), both end portions in the frequency direction of each subframe are control regions mainly used as a physical uplink control channel (PUSCH). Furthermore, the center portion in the frequency direction of each subframe is a data region mainly used as a physical uplink shared channel (PUSCH).

The PUSCH carries a control signal. The control signal, for example, includes CQI (Channel Quality Indicator), PMI (Precoding Matrix Indicator), RI (Rank Indicator), SR (Scheduling Request), and ACK/NACK.

The CQI indicates a modulation scheme and coding rate (MCS) preferred to be used in the downlink, based on downlink channel quality. In the present embodiment, the CQI corresponds to channel quality information.

The PMI indicates a precoder matrix (PM) preferred to be used in the downlink. Specifically, the PMI indicates a precoder matrix in which a beam is directed toward UE serving as a transmission source of the PMI. In the present embodiment, the PMI corresponds to precoder matrix information.

The RI indicates the number of layers (the number of streams) preferred to be used in the downlink.

The SR is a signal for requesting the assignment of an uplink frequency and time resource (an uplink resource block).

The ACK/NACK indicates whether decoding of a signal transmitted through a downlink physical channel (for example, PDSCH) is succeeded.

The PUSCH is a physical channel for carrying a control signal and/or user data. For example, an uplink data region may be assigned only to the user data, or assigned such that the user data and the control signal are multiplexed.

(Configuration of eNB and UE)

Figure 3:
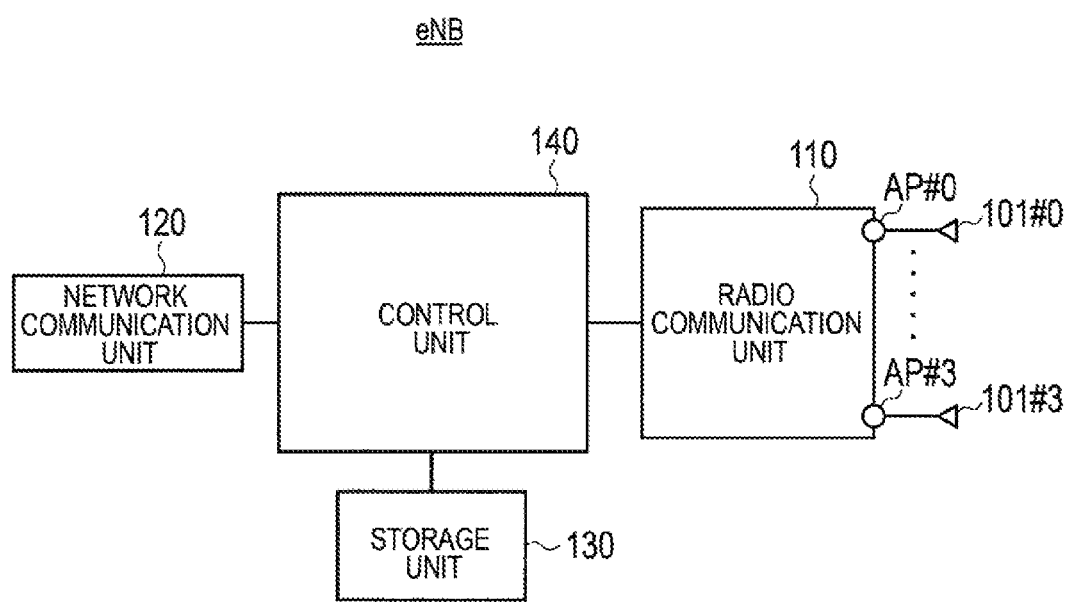
FIG. 3 is a block diagram of eNB according to the first embodiment to the fourth embodiment.

FIG. 3 is a block diagram of the eNB.

As illustrated in FIG. 3, the eNB includes a plurality of antenna elements 101#0 to 101#3, a radio communication unit 110, a network communication unit 120, a storage unit 130, and a control unit 140.

The antenna elements 101#0 to 101#3 are connected to antenna ports AP #0 to AP #3, respectively. In addition, in the present embodiment, the number of antenna ports AP is four. However, the number of antenna ports AP may be two or eight. Furthermore, one antenna element 101 is connected to one antenna port AP. However, two or more antenna elements 101 may be connected to one antenna port AP.

The radio communication unit 110 performs radio communication through a plurality of antenna ports AP (a plurality of antenna elements 101). At the time of transmission, the radio communication unit 110 performs signal processing for a baseband signal, performs up-converting, amplification and the like for the processed signal, and then transmits a radio signal. At the time of reception, the radio communication unit 110 performs amplification, down-converting and the like for a received signal, performs signal processing for a baseband signal, and then outputs the processed signal to the control unit 140.

The radio communication unit 110 transmits, to each antenna port AP, a cell-specific reference signal and/or a CSI reference signal (hereinafter, simply referred to as a "reference signal (RS)") that is used in measurement, demodulation and the like in the UE. Since the reference signals transmitted from the antenna ports AP are different from one another, the UE is able to perform measurement and the like for each antenna port AP.

The radio communication unit 110 transmits a downlink signal (a control signal and/or user data), which was precoded using a precoder matrix, through the plurality of antenna ports AP, thereby controlling a directional pattern, for example, forming a beam or a null.

The radio communication unit 110 supports closed-loop spatial multiplexing, in which a plurality of data streams (layers) are transmitted in a parallel manner through the same frequency and time resource (resource block), on the basis of PMI and RI fed back from the UE. The closed-loop spatial multiplexing is SU-MIMO for a single user (SU) and MU-MIMO for multiple users (MU). However, in the present embodiment, the MU-MIMO is a main target.

Figure 4:
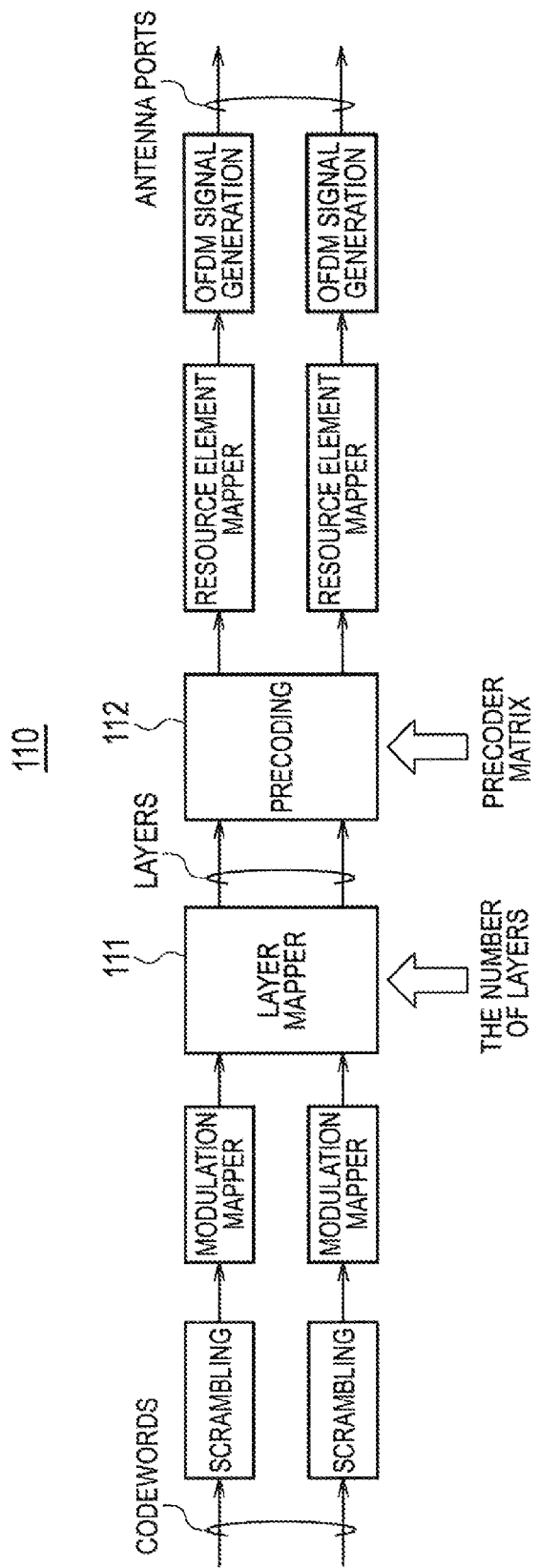
FIG. 4 is a block diagram of a radio communication unit according to the first embodiment to the fourth embodiment.

FIG. 4 is a block diagram of the radio communication unit 110 for performing spatial multiplexing. Details of each block are disclosed in 3GPP TS 36.211. However, an overview of each block will be described herein. As illustrated in FIG. 4, one or two codewords to be transmitted through a physical channel are scrambled, are modulated into a modulation symbol, and then are mapped to a plurality of layers by a layer map 111. The codeword is an error correction data unit. The number of layers is determined on the basis of RI fed back from the UE.

A precoder 112 precodes a modulation symbol of each layer using a precoder matrix. The precoder matrix is determined on the basis of PMI fed back from the UE. The precoded modulation symbol is mapped to a resource element, is converted into an OFDM signal of a temporal domain, and is output to each antenna port AP. In addition, the resource element is a resource unit including one subcarrier and one symbol.

Returning to FIG. 3, the network communication unit 120 communicates with the EPC using the S1 interface. Furthermore, the network communication unit 120 performs communication (inter-base station communication) with adjacent eNB using the X2 interface.

The storage unit 130 is configured using a memory and the like and stores various types of information used for control and the like by the control unit 140. The control unit 140 is configured using a processor and the like, and controls various functions of the eNB.

Figure 5:
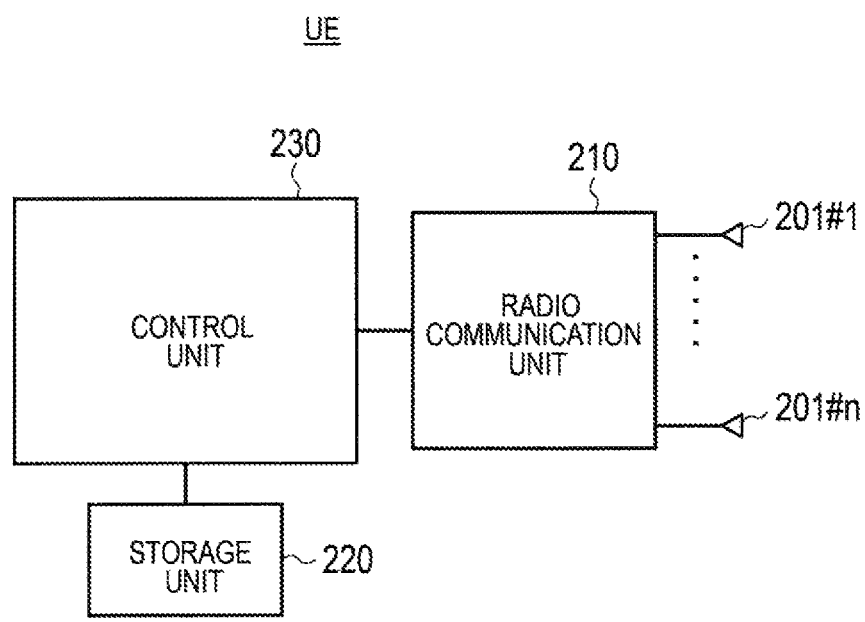
FIG. 5 is a block diagram of UE according to the first embodiment to the fourth embodiment.

FIG. 5 is a block diagram of the UE.

As illustrated in FIG. 5, the UE includes a plurality of antenna elements 201#1 to 201#n, a radio communication unit 210, a storage unit 220, and a control unit 230. The UE may include a user interface unit, a battery and the like.

For example, two or four antenna elements 201 are provided. The radio communication unit 210 performs radio communication through the plurality of antenna elements 201. At the time of transmission, the radio communication unit 210 performs signal processing for a baseband signal, performs up-converting, amplification and the like for the processed signal, and then transmits a radio signal. At the time of reception, the radio communication unit 210 performs amplification, down-converting and the like for a received signal, performs signal processing for a baseband signal, and then outputs the processed signal to the control unit 230.

When the closed-loop spatial multiplexing is performed, the radio communication unit 210 generates channel state information (CSI) on the basis of the reference signal received from the eNB, and feeds back the channel state information to the eNB. The channel state information includes CQI, PMI, and RI.

The radio communication unit 210 selects, according to a predetermined rule, an appropriate precoder matrix from candidates (code books) of precoder matrices determined in advance, and feeds back an index of the selected precoder matrix as PMI.

The radio communication unit 210 performs decoding (MIMO decoding) and the like for a downlink signal received from the eNB, on the basis of the reference signal received from the eNB or TPMI notified from the eNB. The TPMI is information indicating a precoder matrix used when the eNB transmits the downlink signal, and corresponds to transmission precoder matrix information.

The storage unit 220 is configured using a memory and the like and stores various types of information used for control and the like by the control unit 230. The control unit 230 is configured using a processor and the like, and controls various functions of the UE.

(Operation of eNB and UE)

Figure 6:
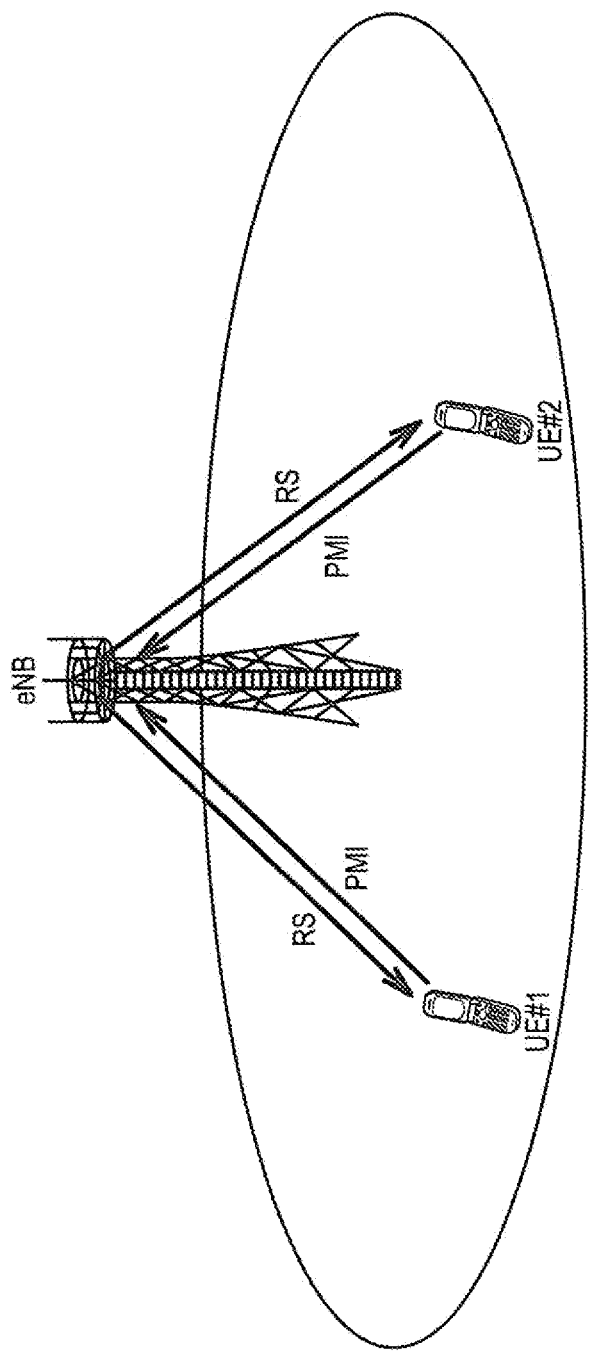
FIG. 6 is a diagram illustrating an operation environment of the eNB and the UE according to the first embodiment and the second embodiment (part 1).
Figure 7:
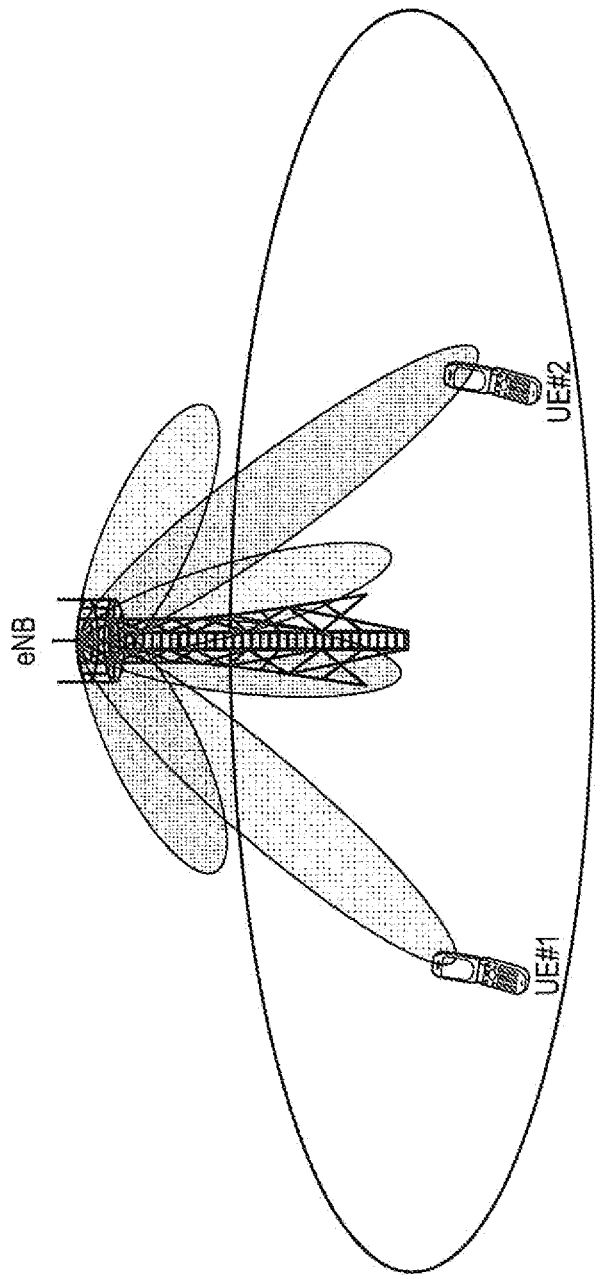
FIG. 7 is a diagram illustrating an operation environment of the eNB and the UE according to the first embodiment and the second embodiment (part 2).

Next, the operations of the eNB and the UE according to the present embodiment will be described. FIG. 6 and FIG. 7 are diagrams illustrating operation environments of the eNB and the UE according to the present embodiment.

As illustrated in FIG. 6 and FIG. 7, the eNB performs the closed-loop spatial communication with two UEs (UE #1 and UE #2). That is, the eNB assigns the same frequency and time resource (resource block) to the UE #1 and UE #2 and performs the MU-MIMO.

As illustrated in FIG. 6, the UE #1 feeds back PMI to the eNB on the basis of a reference signal received from the eNB, wherein the PMI indicates a precoder matrix in which a beam is directed toward the UE #1.

The UE #2 feeds back PMI to the eNB on the basis of the reference signal received from the eNB, wherein the PMI indicates a precoder matrix in which a beam is directed toward the UE #2.

As illustrated in FIG. 7, the eNB performs precoding using the precoder matrix indicated by the PMI fed back from the UE #1, thereby transmitting a downlink signal to the UE #1 in a directional pattern in which a beam is directed toward the UE #1.

Furthermore, the eNB performs precoding using the precoder matrix indicated by the PMI fed back from the UE #2, thereby transmitting a downlink signal to the UE #2 in a directional pattern in which a beam is directed toward the UE #2.

However, since each UE does not recognize another UE to be multiplexed to each UE, each UE feeds back PMI preferred to each UE. Therefore, it is not always the case that the eNB appropriately directs a null toward another UE (for example, the UE #2) by a precoder matrix indicated by PMI fed back from UE (for example, the UE #1). If the null is not directed toward another UE, it is not possible to appropriately perform spatial multiplexing (MU-MIMO).

In order to avoid such a problem, it is considered to apply a precoder matrix by which the eNB is able to perform appropriate null steering, instead of a precoder matrix indicated by the fed-back PMI. However, if such a precoder matrix is applied, it is probable that channel quality of UE (for example, the UE #1), toward which a beam should originally be directed, is deteriorated.

In this regard, in the present embodiment, both excellent beamforming and excellent null steering are performed as follows.

Firstly, each UE measures received power of a reference signal (RSRP) transmitted from each antenna port AP of the eNB, and selects an antenna port AP with low degree of contribution at the time of transmission from the eNB. For example, when received power of a reference signal transmitted from a certain antenna port AP becomes lower than a threshold value, the antenna port AP may be selected as the antenna port AP with low degree of contribution. Alternatively, RSRPs measured for each antenna port AP of the eNB may be compared with one another, and k (k≥1) antenna ports AP in an ascending order of the RSRP may be selected as the antenna port AP with low degree of contribution. In addition, the number of antenna ports AP selectable as the antenna port AP with low degree of contribution is smaller than the number of antenna ports AP of the eNB.

Secondly, when each UE feeds back PMI to the eNB, each UE notifies the eNB of NAPI (Negligible Antenna Port Index) indicating the antenna port AP with low degree of contribution. In the present embodiment, the NAPI corresponds to antenna port information. In addition, the NAPI may not be notified when no spatial multiplexing (MU-MIMO) is performed. For example, when the spatial multiplexing is performed, the eNB may instruct each UE, which is an object of the spatial multiplexing, to notify the NAPI.

Thirdly, in a precoder matrix indicated by PMI fed back from one UE (for example, the UE #1), the eNB designates a precoder matrix element (hereinafter, referred to as a "weight") corresponding to an antenna port AP indicated by the NAPI notified from the one UE. Furthermore, the eNB changes the designated weight such that a null is directed toward another UE (for example, the UE #2). Then, the eNB applies a precoder matrix including the changed weight to transmission to the one UE.

According to such a method, only a weight corresponding to the antenna port AP with low degree of contribution is changed at the time of the transmission to the one UE, so that it is possible to perform null steering to another UE while minimizing an adverse influence on beamforming for the one UE.

For the transmission to the one UE, in consideration of the adverse influence, it is preferable to apply a modulation scheme and coding rate (MCS) with high error resistance as compared with MCS to be originally applied. Thus, in the present embodiment, when each UE notifies the eNB of the NAPI, each UE corrects CQI to be fed back to the eNB, in anticipation of quality deterioration when the eNB changes the weight corresponding to the antenna port AP with low degree of contribution.

Furthermore, in the case of a transmission mode using a cell-specific reference signal in data decoding, the eNB should notify the UE of PMI, which corresponds to a precoder matrix used by the eNB in transmission, as TPMI. This is because since no precoding is performed for CRS, the UE is not able to designate a state (a precoder matrix) of precoding on the basis of the CRS, and to decode precoded data.

Accordingly, when the weight corresponding to the antenna port AP with low degree of contribution is changed, if PMI corresponding to a changed precoder matrix has not been defined for the TPMI notified to the UE, the eNB selects PMI corresponding to a precoder matrix before the change as TPMI, and if the PMI corresponding to a precoder matrix after the change has been defined, the eNB selects the PMI as TPMI.

On the other hand, in the case of a transmission mode using DMRS (DeModulation Reference Signal/UE specific Reference Signal) in data decoding, the eNB needs not to notify the TPMI. This is because since precoding is performed for the DMRS similarly to data, the UE is able to decode data without considering an actually used precoder matrix.

Figure 8:
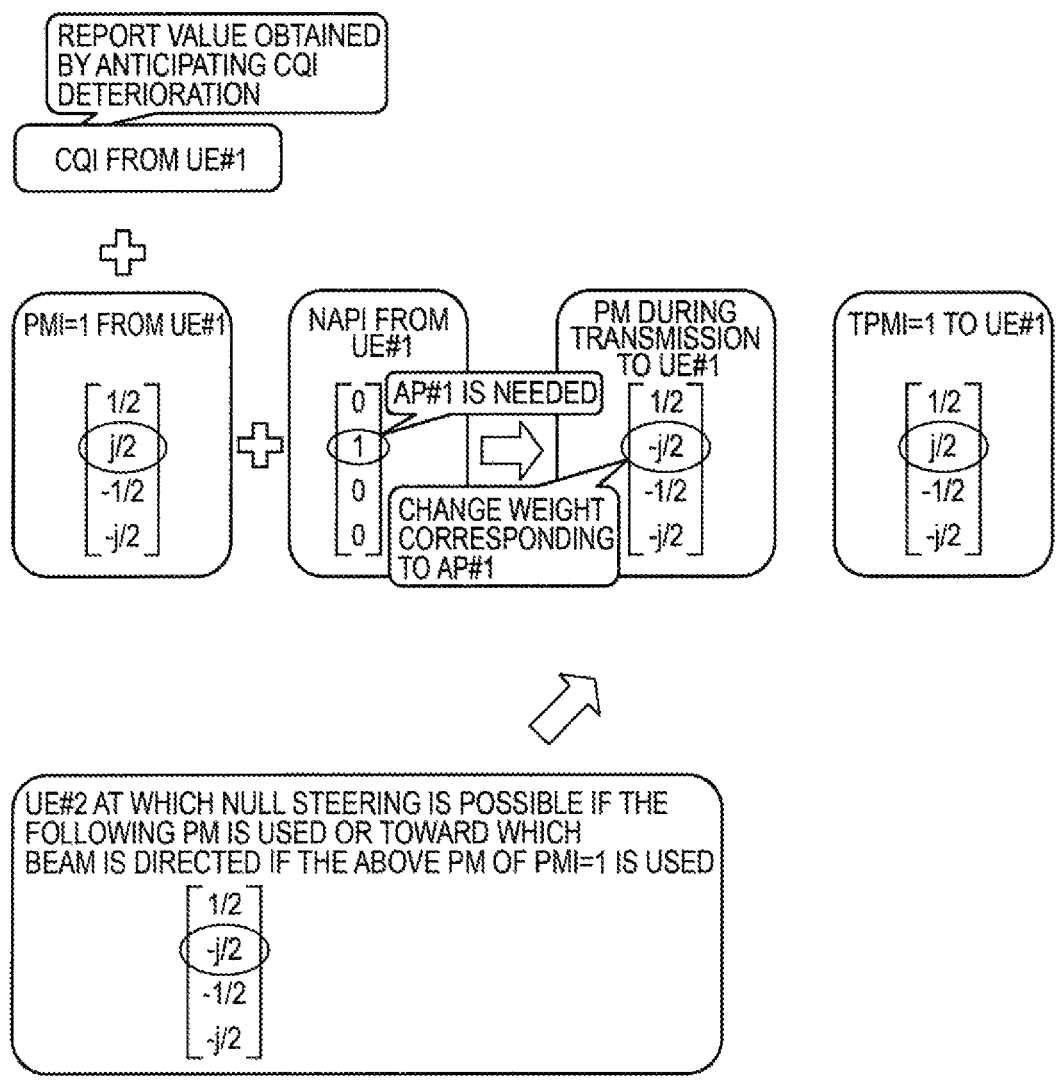
FIG. 8 is a diagram for explaining a detailed example of operations of the eNB and the UE according to the first embodiment.

FIG. 8 is a diagram for explaining a detailed example of operations of the eNB and the UE according to the present embodiment.

As illustrated in FIG. 8, the UE #1 feeds back PMI "1" to the eNB. Furthermore, in a precoder matrix indicated by the PMI "1", a weight corresponding to the antenna port AP #0 of the eNB is "½", a weight corresponding to the antenna port AP #1 is "j/2", a weight corresponding to the antenna port AP #2 is "−½", and a weight corresponding to the antenna port AP #3 is "−j/2".

When feeding back the PMI to the eNB, the UE #1 notifies the eNB of NAPI indicating an antenna port AP with low degree of contribution. In the example of FIG. 8, the NAPI indicates that the degree of contribution of the antenna port AP #1 is low (not necessary).

Moreover, the UE #1 feeds back, to the eNB, CQI corresponding to the worst value obtained by anticipating deterioration when the weight corresponding to the antenna port AP #1 was changed.

Meanwhile, for the UE #2, when using a precoder matrix (PM) in which the weight corresponding to the antenna port AP #0 is "½", the weight corresponding to the antenna port AP #1 is "−j/2", the weight corresponding to the antenna port AP #2 is "−½", and the weight corresponding to the antenna port AP #3 is "−j/2", it is assumed that a null can be directed toward the UE #2. Information regarding that a null is directed toward the UE #2, for example, is acquirable on the basis of Best Companion PMI (which will be described in detail later) from the UE #2. Alternatively, the information regarding that a null is directed toward the UE #2 is detectable in a learning manner from the fact that CQI fed back from the UE #2 is not deteriorated, at the time of actual assignment.

Alternatively, among precoder matrices indicated by the PMI "1", when using a precoder matrix in which the weight corresponding to the antenna port AP #1 is "j/2", it is assumed that a beam is directed toward the UE #2. Information regarding that a beam is directed toward the UE #2, for example, is acquirable on the basis of PMI from the UE #2. Alternatively, the information regarding that a beam is directed toward the UE #2 is detectable in a learning manner from the fact that CQI fed back from the UE #2 is significantly deteriorated, at the time of actual assignment.

In the precoder matrix indicated by the PMI fed back from the UE #1, the eNB designates a weight corresponding to the antenna port AP #1 indicated by the NAPI notified from the UE #1. Furthermore, the eNB changes the designated weight such that a null is directed toward the UE #2 or a beam is not directed toward the UE #2. In the example of FIG. 8, the eNB changes the weight corresponding to the antenna port AP #1 from "j/2" to "−j/2". Then, the eNB determines to apply a precoder matrix (PM) including the changed weight to transmission to the UE #1.

In addition, in relation to the precoder matrix, since the weight corresponding to the antenna port AP #0 has been fixedly designed, when the AP #0 is not necessary, a weight, other than, the weight corresponding to the antenna port AP #0, is equivalently rotated.

Furthermore, the eNB determines MCS to be applied to the transmission to the UE #1, based on the CQI fed back from the UE #1. Moreover, if PMI corresponding to a precoder matrix after the change has not been defined, the eNB selects PMI corresponding to a precoder matrix before the change as TPMI, and if the PMI corresponding to the precoder matrix after the change has been defined, the eNB selects the PMI as TPMI. In the example of FIG. 8, the eNB selects the PMI "1" corresponding to the precoder matrix before the change as the TPMI. Then, the eNB transmits a downlink signal to the UE #1 using the determined precoder matrix (after the change) and the determined MCS, and notifies the UE #1 of the selected TPMI.

Figure 9:
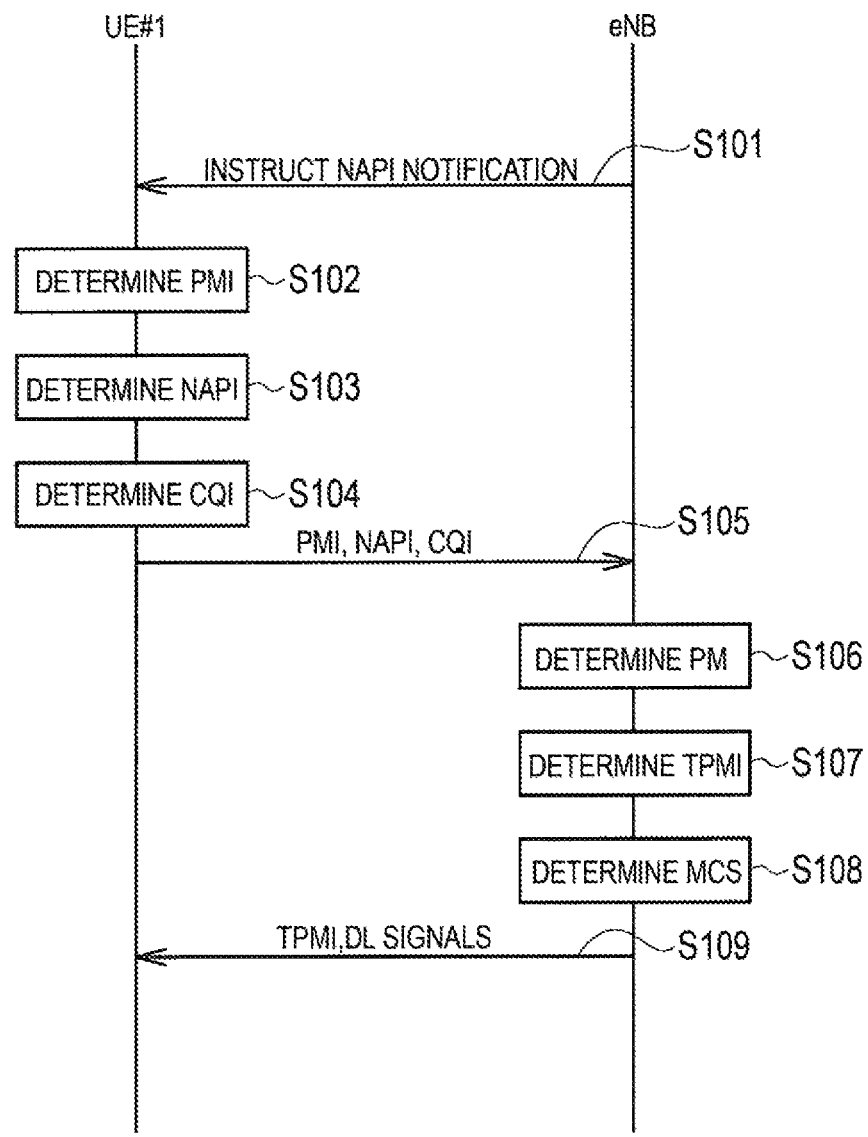
FIG. 9 is a sequence diagram illustrating a detailed example of an operation sequence of the eNB and the UE according to the first embodiment.

FIG. 9 is a sequence diagram illustrating a detailed example of an operation sequence of the eNB and the UE #1 according to the present embodiment.

As illustrated in FIG. 9, in step S101, the eNB instructs the UE #1 to start to notify NAPI in response to the start of the MU-MIMO.

In step S102, the UE #1 determines PMI to be fed back to the eNB.

In step S103, the UE #1 selects an antenna port AP with low degree of contribution at the time of transmission from the eNB, and determines NAPI to be notified to the eNB.

In step S104, the UE #1 determines CQI, which corresponds to the worst value obtained by anticipating deterioration when a weight corresponding to the antenna port AP with low degree of contribution at the time of transmission from the eNB is changed, as CQI to be fed back to the eNB.

In step S105, the UE #1 feeds back the determined PMI and CQI to the eNB, and notifies the eNB of the determined NAPI.

In step S106, the eNB determines a precoder matrix (PM) to be applied to transmission to the UE #1, based on the PMI and the NAPI from the UE #1.

In step S107, the eNB determines TPMI to be notified to the UE #1, based on the precoder matrix (PM) to be applied to the transmission to the UE #1.

In step S108, the eNB determines MCS to be applied to the transmission to the UE #1, based on the CQI from the UE #1.

In step S109, the eNB notifies the UE #1 of the determined TPMI, and transmits a downlink signal using the determined precoder matrix (PM) and MCS.

(Conclusion)

As described above, when feeding back, to the eNB (a serving cell), PMI indicating a precoder matrix in which a beam is directed toward the UE #1, the UE #1 notifies the eNB of NAPI indicating an antenna port AP with low degree of contribution at the time of transmission from the eNB. In this way, the eNB is able to recognize the antenna port AP with low degree of contribution at the time of transmission. Thus, the eNB is able to change the weight, which corresponds to the antenna port AP with low degree of contribution in a precoder matrix that is used in the transmission of a downlink signal to the UE #1, for the sake of the UE #2. Consequently, the eNB is able to appropriately direct a null toward the UE #2 while appropriately directing a beam toward the UE #1.

In the present embodiment, when the MU-MIMO is performed, the eNB instructs the UE #1 to notify the NAPI. In this way, since the NAPI is notified in the case in which the notification of the NAPI is necessary, but the NAPI is not notified in the case in which the notification of the NAPI is not necessary, it is possible to suppress an increase in overhead.

In the present embodiment, the UE #1 selects the antenna port AP with low degree of contribution based on RSRP of each reference signal that is received by the UE #1 from each antenna port AP of the eNB. In this way, it is possible to appropriately select the antenna port AP with low degree of contribution at the time of transmission from the antenna ports AP of the eNB.

In the present embodiment, when notifying the eNB of the NAPI, the UE #1 corrects CQI to be fed back to the eNB. In this way, even in the case in which the eNB changes a weight corresponding to the antenna port AP with low degree of contribution, it is possible to feed back CQI obtained by anticipating quality deterioration due to the change to the eNB.

In the present embodiment, the eNB determines TPMI to be transmitted to the UE #1, on the basis of PMI received from the UE #1. In this way, even in the case in which the eNB changes the weight corresponding to the antenna port AP with low degree of contribution, it is possible to appropriately notify the UE #1 of TPMI.

Second Embodiment

Hereinafter, a second embodiment will be described.

In the aforementioned first embodiment, in the MU-MIMO, when feeding back, to the eNB (the serving cell), precoder matrix information (PMI) indicating a precoder matrix in which a beam is directed toward the UE #1, the UE #1 notifies the eNB of the NAPI indicating the antenna port AP with low degree of contribution at the time of transmission from the eNB.

On the other hand, in the present embodiment, in the MU-MIMO, the UE #1 feeds back plural pieces of precoder matrix information (a plurality of PMIs) to the eNB (the serving cell) with respect to one frequency band that is used in the transmission from the eNB. Specifically, the UE #1 feeds back the most preferred n (n≥2) PMIs to be used in the downlink to the eNB.

The present embodiment is equal to FIG. 6 and FIG. 7 in terms of the operation environments of the eNB and the UE. However, by the following operation, both excellent beamforming and excellent null steering are performed in the MU-MIMO.

(Operation of eNB and UE)

Firstly, each UE feeds back, to the eNB, the most preferred n (n≥2) PMIs to be used in the downlink with respect to one frequency band that is used in the transmission from the eNB. Hereinafter, the "one frequency band" indicates a frequency unit by which at least one PMI is to be determined. For example, when the eNB designates PMI feedback in each sub-band, one sub-band corresponds to the one frequency band. The sub-band indicates a frequency unit including a plurality of resource blocks. Alternatively, when the PMI feedback in an entire downlink frequency band is designated from the eNB, the downlink frequency band corresponds to the one frequency band.

In addition, when no spatial multiplexing (MU-MIMO) is performed, each UE feeds back one PMI, instead of n PMIs, with respect to one frequency band. For example, when the spatial multiplexing is performed, the eNB may instruct each UE, which is an object of the spatial multiplexing, to feed back the n PMIs with respect to the one frequency band.

Secondly, the eNB selects one PMI from the n PMIs fed back from one UE (for example, the UE #1) such that a null is directed toward another UE (for example, the UE #2). Then, the eNB applies a precoder matrix indicted by the selected PMI to transmission to the one UE.

According to such a method, one PMI is selected from the most preferred n PMIs to be used in the downlink in consideration of another UE, so that it is possible to perform null steering to another UE while minimizing an adverse influence on beamforming for the one UE.

For the transmission to the one UE, in consideration of the adverse influence, it is preferable to apply a modulation scheme and coding rate (MCS) with high error resistance as compared with MCS corresponding to the most preferred PMI to be originally applied.

Thus, in the present embodiment, when feeding back the n PMIs to the eNB with respect to the one frequency band, each UE feeds back CQI having a number corresponding to the number of PMIs to the eNB. In this case, the eNB selects MCS based on CQI corresponding to the PMI selected from the n PMIs.

Alternatively, even in the case of feeding back the n PMIs with respect to the one frequency band, each UE may feed back one CQI to the eNB. The one CQI is determined based on the least preferred PMI among the n PMIs.

Figure 10:
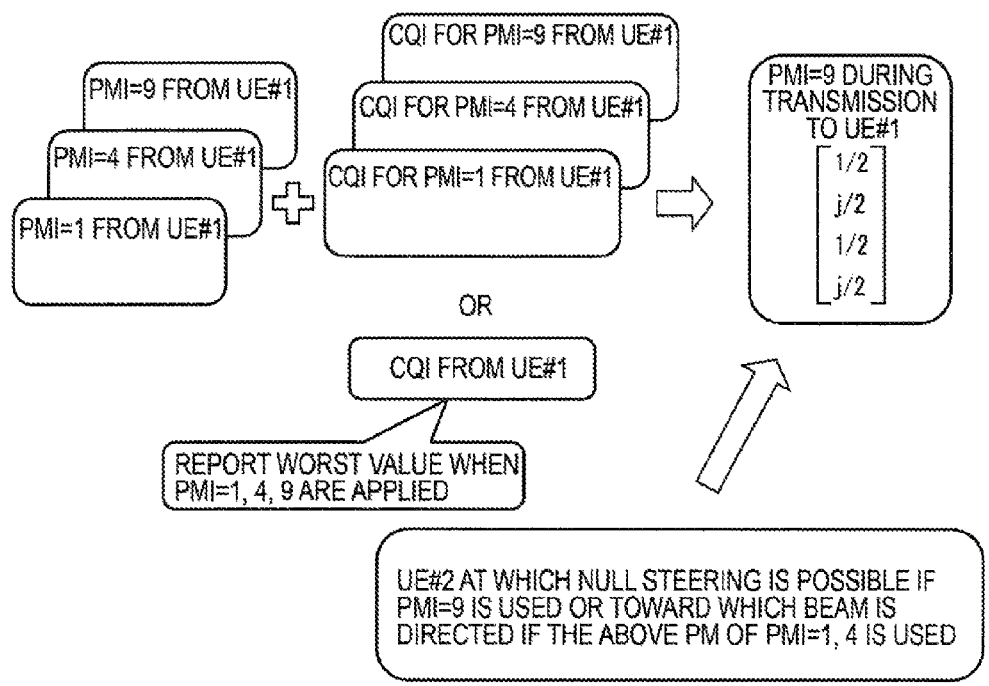
FIG. 10 is a diagram for explaining a detailed example of operations of the eNB and the UE according to the second embodiment.

FIG. 10 is a diagram for explaining a detailed example of operations of the eNB and the UE according to the present embodiment.

As illustrated in FIG. 10, the UE #1 feeds back the most preferred three PMIs to the eNB. For example, the three PMIs are PMI "1", PMI "4", and PMI "9" in order from the most preferred.

Furthermore, the UE #1 feeds back three CQIs corresponding to the three PMIs to the eNB. Specifically, the UE #1 feeds back, to the eNB, CQI corresponding to the PMI "1", CQI corresponding to the PMI "4", and CQI corresponding to the PMI "9".

Alternatively, the UE #1 feeds back, to the eNB, one CQI corresponding to the least preferred PMI (for example, the PMI "9") among the three PMIs.

Meanwhile, for the UE #2, when using the PMI "9", it is assumed that a null can be directed toward the UE #2. Alternatively, when using a precoder matrix indicated by the PMI "1" or the PMI "4", it is assumed that a beam is directed toward the UE #2.

The eNB selects one PMI from the three PMIs fed back from the UE #1 such that a null is directed toward the UE #2 or a beam is not directed toward the UE #2. In the example of FIG. 10, the eNB selects the PMI "9". Then, the eNB determines to apply a precoder matrix (PM) indicated by the selected PMI "9" to transmission to the UE #1.

Furthermore, the eNB determines MCS to be applied to the transmission to the UE #1, based on the n CQIs or one CQI fed back from the UE #1. When the n CQIs are fed back, the eNB determines the MCS based on the CQI corresponding to the selected PMI "9". On the other hand, when the one CQI is fed back, the eNB determines the MCS based on the one CQI.

Then, the eNB transmits a downlink signal to the UE #1 using the determined precoder matrix and the determined MCS, and notifies the UE #1 of TPMI corresponding to the selected PMI "9".

Figure 11:
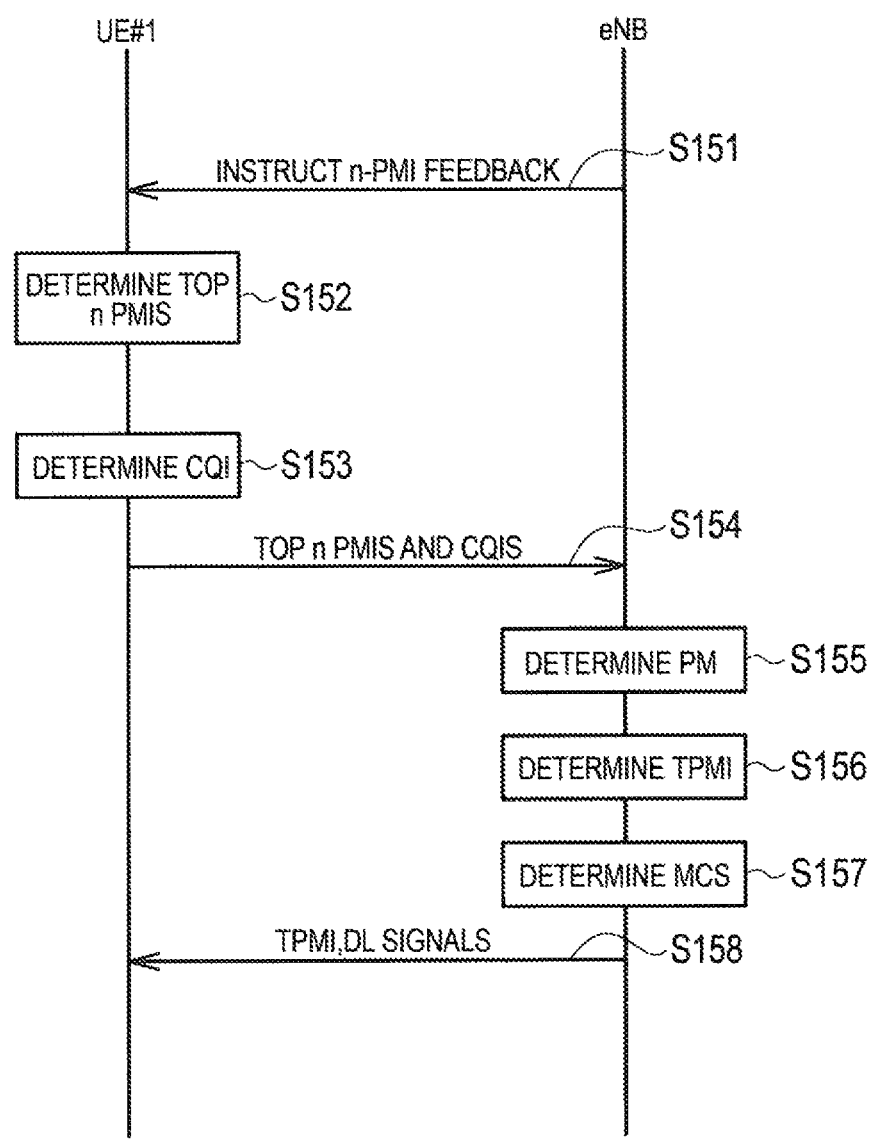
FIG. 11 is a sequence diagram illustrating a detailed example of an operation sequence of the eNB and the UE according to the second embodiment.

FIG. 11 is a sequence diagram illustrating a detailed example of an operation sequence of the eNB and the UE #1 according to the present embodiment.

As illustrated in FIG. 11, in step S151, the eNB instructs the UE #1 to start to feed back the most preferred n PMIs with respect to one frequency band.

In step S152, the UE #1 determines the most preferred n PMIs which are to be fed back to the eNB.

In step S153, the UE #1 determines n CQIs, which correspond to the determined n PMIs, or CQI, which corresponds to the least preferred PMI among the n PMIs, as CQI to be fed back to the eNB.

In step S154, the UE #1 feeds back the determined n PMIs and the determined n CQIs or one CQI to the eNB.

In step S155, the eNB determines a precoder matrix (PM) to be applied to transmission to the UE #1, based on the n PMIs from the UE #1, such that a null is directed toward the UE #2 or a beam is not directed toward the UE #2.

In step S156, the eNB determines TPMI to be notified to the UE #1, based on the precoder matrix (PM) to be applied to the transmission to the UE #1.

In step S157, the eNB determines MCS to be applied to the transmission to the UE #1, based on the n CQIs or one CQI from the UE #1.

In step S158, the eNB notifies the UE #1 of the determined TPMI, and transmits a downlink signal using the determined precoder matrix (PM) and MCS.

(Conclusion)

As described above, the UE #1 feeds back a plurality of PMIs to the eNB with respect to one frequency band that is used in transmission from the eNB. In this way, the eNB is able to recognize the plurality of PMIs available for the transmission of a downlink signal. Thus, the eNB is able to select one of the plurality of PMIs while considering the UE #2. Consequently, the eNB is able to appropriately direct a null toward the UE #2 while appropriately directing a beam toward the UE #1.

In the present embodiment, the plurality of PMIs are the most preferred n (n≥2) PMIs to be used in the downlink. In this way, the eNB is able to appropriately direct a beam toward the UE #1.

In the present embodiment, when the MU-MIMO is performed, the eNB directs a value of n to the UE #1. In this way, since the n PMIs are notified in the case in which the notification of the n PMIs is necessary, but the n PMIs are not notified in the case in which the notification of the n PMIs is not necessary, it is possible to suppress an increase in overhead.

In the present embodiment, when feeding back a plurality of PMIs with respect to one frequency band, the UE #1 feeds back a plurality of CQIs corresponding to the plurality of PMIs to the eNB. In this way, the eNB is able to apply CQI corresponding to a selected PMI to transmission to the UE #1.

Alternatively, in the present embodiment, even in the case of feeding back a plurality of PMIs with respect to one frequency band, the UE #1 feeds back one CQI to the eNB. The one CQI is determined based on the least preferred PMI among the plurality of PMIs. In this way, even in the case in which the eNB selects the least preferred PMI from the plurality of PMIs, it is possible to feed back CQI obtained by anticipating quality deterioration due to the selection to the eNB.

First Modification of Second Embodiment

In the aforementioned second embodiment, the UE #1 feeds back n (n≥2) PMIs to the eNB.

On the other hand, in the present modification, the UE #1 feeds back n (n≥2) BC-PMIs to the eNB. That is, the UE #1 feeds back n BC-PMIs, which are the least affected by interference given from the eNB to the UE #1, from among a plurality of previously defined PMIs. The eNB uses the fed-back n BC-PMIs as reference information when selecting another UE to be spatially multiplexed with the UE #1.

The present modification is equal to FIG. 6 and FIG. 7 in terms of the operation environments of the eNB and the UE. However, by the following operation, both excellent beamforming and excellent null steering are performed in the MU-MIMO.

Firstly, the UE #1 selects n (n≥2) BC-PMIs with respect to one frequency band (for example, each sub-band) that is used in transmission from the eNB, and feeds back the n BC-PMIs to the eNB. Furthermore, the UE #1 feeds back one or a plurality of PMIs (normal PMIs) to the eNB.

In addition, when no spatial multiplexing (MU-MIMO) is performed, the UE #1 may not feed back the BC-PMI. For example, when the spatial multiplexing is performed, the eNB may instruct each UE, which is an object of the spatial multiplexing, to feed back the n BC-PMIs with respect to one frequency band.

Secondly, the eNB designates another UE (for example, the UE #2) that feeds back PMI (consistent PMI) coinciding with one of the n BC-PMIs fed back from the UE #1. Furthermore, the eNB assigns, to the other UE, a radio resource (a time and frequency resource) equal to that assigned to the UE #1. Then, the eNB applies a precoder matrix indicated by the consistent PMI to transmission to the other UE. In addition, the eNB applies PMI (normal PMI) from the UE #1 to transmission to the UE #1.

According to such a method, at the time of transmission to the UE #2, it is possible to direct a null toward the UE #1 while directing a beam toward the UE #2. Furthermore, a plurality of BC-PMIs are fed back, so that it is possible to increase the probability of presence of another UE that feeds back the consistent PMI, resulting in the reduction of limitation for scheduling.

In addition, in the present modification, the UE #1 may feed back one CQI corresponding to the least preferred PMI among PMIs obtained by excluding the n BC-PMIs from a plurality of PMIs defined in advance.

Second Modification of Second Embodiment

In the aforementioned second embodiment, the UE #1 feeds back n (n≥2) PMIs to the eNB.

On the other hand, in the present modification, the UE #1 feeds back n (n≥2) WC-PMIs to the eNB. That is, the UE #1 feeds back n WC-PMIs, which are the most affected by interference given from the eNB to the UE #1, from among a plurality of previously defined PMIs. The eNB uses the fed-back n WC-PMIs as reference information when selecting another UE to be spatially multiplexed with the UE #1.

The present modification is equal to FIG. 6 and FIG. 7 in terms of the operation environments of the eNB and the UE. However, by the following operation, both excellent beamforming and excellent null steering are performed in the MU-MIMO.

Firstly, the UE #1 selects n (n≥2) WC-PMIs with respect to one frequency band (for example, each sub-band) that is used in transmission from the eNB, and feeds back the n WC-PMIs to the eNB. Furthermore, the UE #1 feeds back one or a plurality of PMIs (normal PMIs) to the eNB.

In addition, when no spatial multiplexing (MU-MIMO) is performed, the UE #1 may not feed back the WC-PMI. For example, when the spatial multiplexing is performed, the eNB may instruct each UE, which is an object of the spatial multiplexing, to feed back the n WC-PMIs with respect to one frequency band.

Secondly, the eNB designates another UE (for example, the UE #2) that feeds back PMI (inconsistent PMI) not coinciding with any of the n WC-PMIs fed back from the UE #1. Furthermore, the eNB assigns, to the other UE, a radio resource (a time and frequency resource) equal to that assigned to the UE #1. Then, the eNB applies a precoder matrix indicated by the inconsistent PMI to transmission to the other UE. In addition, the eNB applies PMI (normal PMI) from the UE #1 to transmission to the UE #1.

According to such a method, at the time of transmission to the UE #2, it is possible to direct a beam toward the UE

2 while preventing a beam being directed toward the UE #1. Furthermore, a plurality of WC-PMIs are fed back, so that it is possible to reduce the probability that a beam is directed toward the UE #1, resulting in the improvement of an interference suppression effect.

Third Embodiment

Hereinafter, a third embodiment will be described. The third embodiment is an embodiment in which the present invention is applied to CB (Coordinated Beamforming)-COMP (Coordinated Multi-Point) in the LTE system. Hereinafter, differences from the first embodiment will be mainly described, and a description identical to that of the first embodiment will be appropriately omitted.

In the CoMP, an antenna group in the same place is positioned as one "point" and a plurality of points communicate with the UE in cooperation with one another. A point group performing cooperative communication with the UE is called a CoMP cooperation set. The CB-CoMP indicates a scheme in which only one point holds data for the downlink, and a plurality of points perform beamforming in cooperation with one another. In the present embodiment, the CoMP cooperation set includes a plurality of eNBs.

(Operation of eNB and UE)

Figure 12:
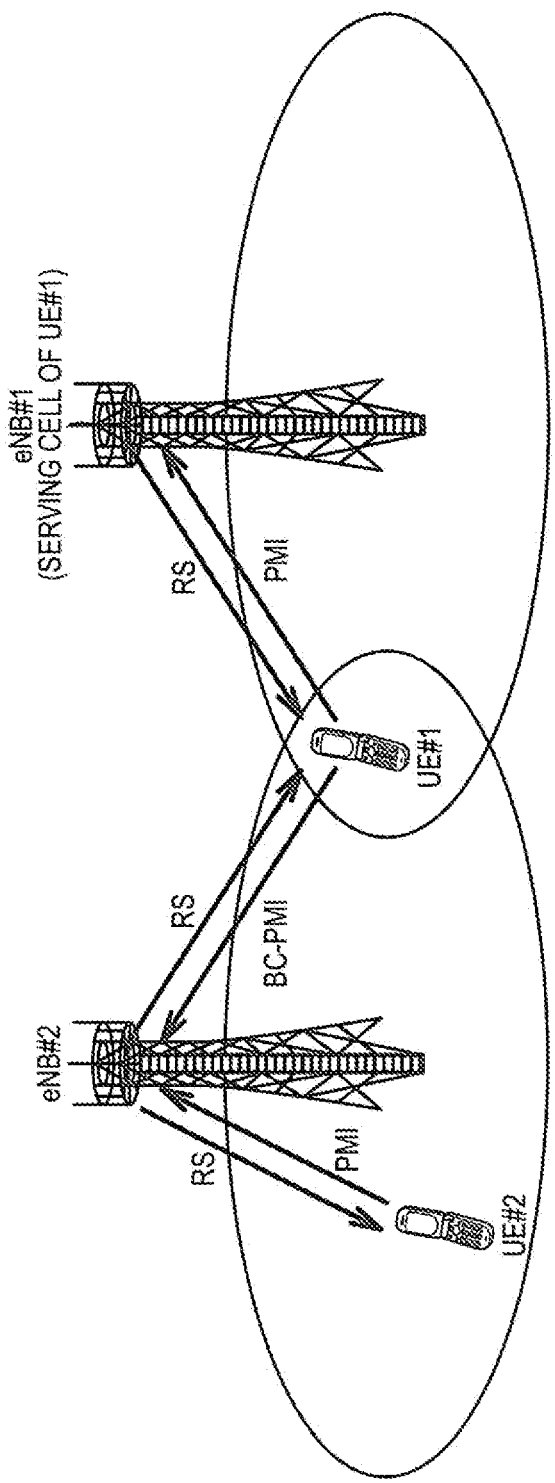
FIG. 12 is a diagram illustrating an operation environment of the eNB and the UE according to the third embodiment and the fourth embodiment (part 1).
Figure 13:
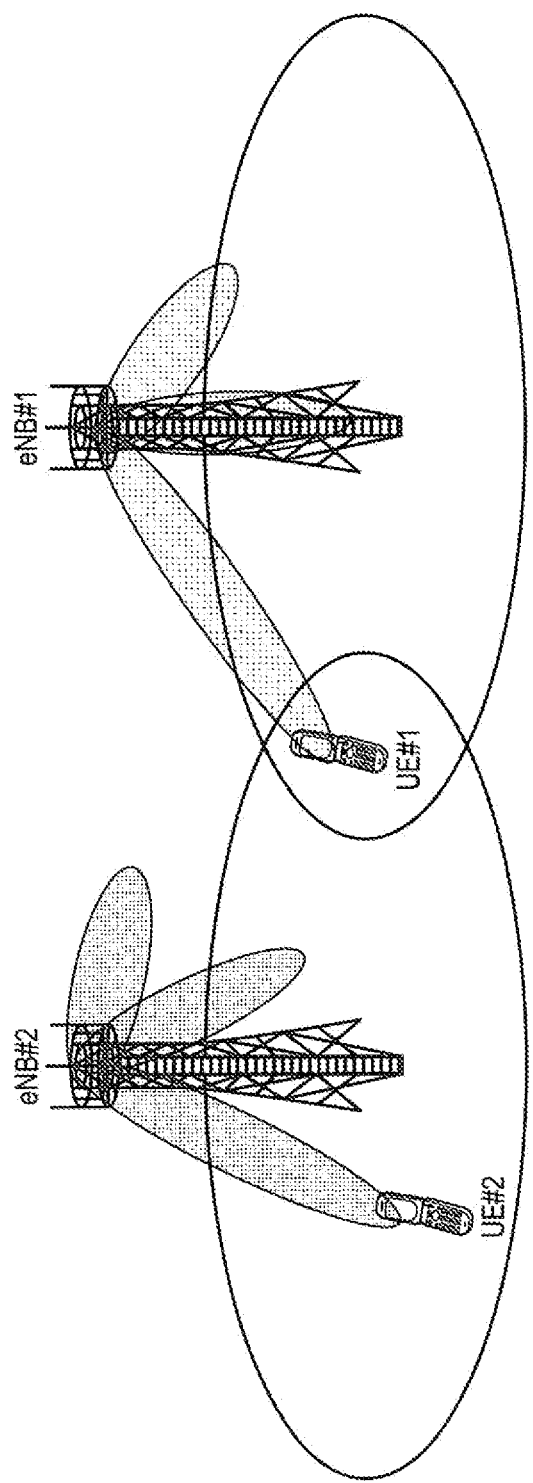
FIG. 13 is a diagram illustrating an operation environment of the eNB and the UE according to the third embodiment and the fourth embodiment (part 2).

FIG. 12 and FIG. 13 are diagrams illustrating operation environments of the eNB and the UE according to the present embodiment. In FIG. 12 and FIG. 13, eNB #1 and eNB #2 constitute cells adjacent to each other.

As illustrated in FIG. 12 and FIG. 13, the UE #1 performs communication by employing the eNB #1 as a serving cell, and the UE #2 performs communication by employing the eNB #2 as a serving cell. The eNB #1 and the eNB #2 perform the CB-CoMP with the UE #1. Specifically, the eNB #1 directs a beam toward the UE #1 subordinate to the eNB #1. The eNB #2 directs a null toward the UE #1 subordinate to the eNB #1 while directing a beam toward the UE #2 subordinate to the eNB #2.

As illustrated in FIG. 12, the UE #1 feeds back, to the eNB #1, PMI indicating a precoder matrix, in which a beam is directed toward the UE #1, on the basis of a reference signal received from the eNB #1.

Furthermore, the UE #1 feeds back, to the eNB #2, Best Companion PMI (BC-PMI) indicating a precoder matrix, in which a null is directed toward the UE #1, on the basis of a reference signal received from the eNB #2. The BC-PMI may be directly fed back from the UE #1 to the eNB #2. Alternatively, the BC-PMI may be indirectly fed back from the UE #1 to the eNB #2 via the eNB The UE #2 feeds back, to the eNB #2, PMI indicating a precoder matrix, in which a beam is directed toward the UE #2, on the basis of the reference signal received from the eNB #2.

As illustrated in FIG. 13, the eNB #1 performs precoding using the precoder matrix indicated by the PMI fed back from the UE #1, thereby transmitting a downlink signal to the UE #1 in a directional pattern in which a beam is directed toward the UE #1.

The eNB #2 performs precoding using the precoder matrix indicated by the BC-PMI fed back from the UE #1, thereby transmitting a downlink signal to the UE #2 in a directional pattern in which a null is directed toward the UE #1.

However, since the UE #1 does not recognize the UE #2, the UE #1 feeds back BC-PMI preferred to the UE #1. Therefore, it is not always the case that the eNB #2 appropriately directs a beam toward the UE #2 by a precoder matrix indicated by the BC-PMI fed back from the UE #1.

In order to avoid such a problem, it is considered that the eNB #2 performs precoding using a precoder matrix indicated by PMI fed back from the UE #2, thereby transmitting a downlink signal to the UE #2 in a directional pattern in which a beam is directed toward the UE #2. However, if such a precoder matrix is applied, it is probable that channel quality of the UE #1, toward which a null is originally directed, is deteriorated.

In this regard, in the present embodiment, both excellent beamforming and excellent null steering are performed as follows.

Firstly, the UE #1 measures received power of a reference signal (RSRP) transmitted from each antenna port AP of the eNB #2, and selects an antenna port AP with low degree of contribution at the time of transmission from the eNB #2. For example, when received power of a reference signal transmitted from a certain antenna port AP becomes lower than a threshold value, the antenna port AP may be selected as the antenna port AP with low degree of contribution. Alternatively, RSRPs measured in the antenna ports AP of the eNB #2 may be compared with one another, and k (k≥1) antenna ports AP in an ascending order of the RSRP may be selected as the antenna port AP with low degree of contribution. In addition, the number of antenna ports AP selectable as the antenna port AP with low degree of contribution is smaller than the number of antenna ports AP of the eNB #2.

Secondly, when the UE #1 feeds back BC-PMI to the eNB #2, the UE #1 notifies the eNB #2 of NAPI indicating the antenna port AP with low degree of contribution. In addition, the NAPI as additional information of the BC-PMI may not be notified when no CB-COMP is performed. For example, when the CB-COMP is performed, the eNB #2 (or the eNB #1) may instruct the UE #1 to notify the NAPI.

Thirdly, in a precoder matrix indicated by BC-PMI fed back from the UE #1, the eNB #2 designates a weight corresponding to an antenna port AP indicated by the NAPI notified from the UE #1. Furthermore, the eNB #2 changes the designated weight such that a beam is directed toward the UE #2. Then, the eNB #2 applies a precoder matrix including the changed weight to transmission to the UE #2.

According to such a method, only a weight corresponding to the antenna port AP with low degree of contribution is changed, so that it is possible to perform beamforming to the UE #2 while minimizing an adverse influence on null steering for the UE #1.

Figure 14:
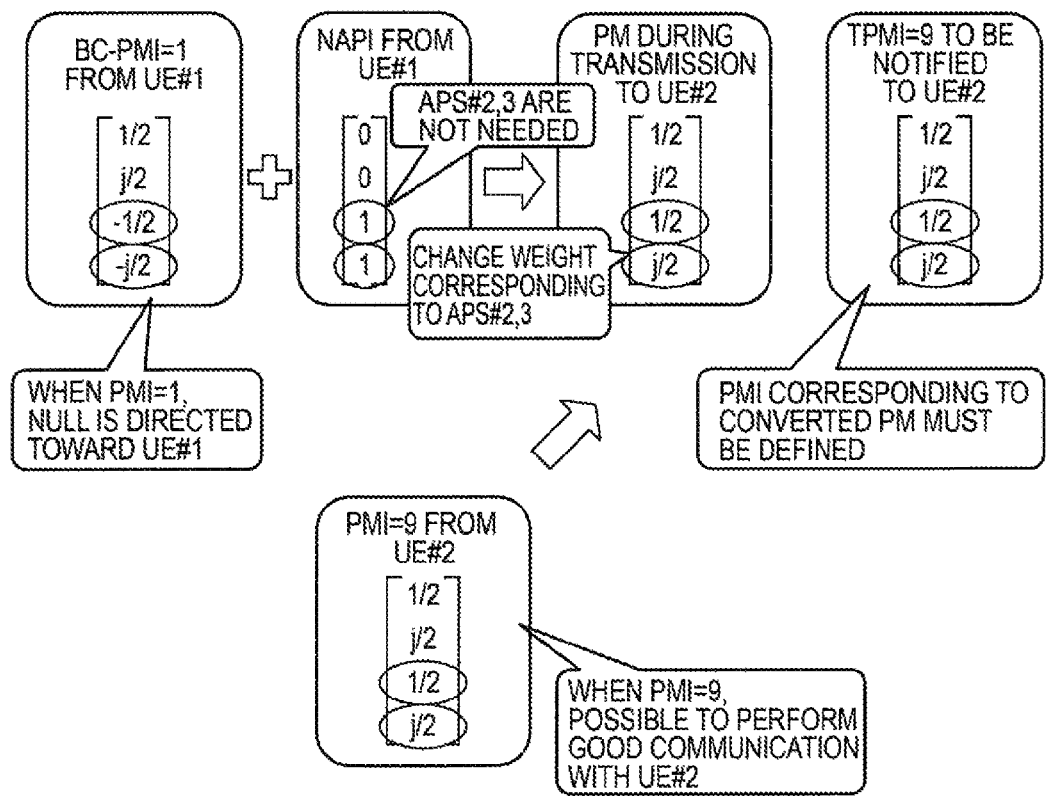
FIG. 14 is a diagram for explaining a detailed example of operations of the eNB and the UE according to the third embodiment.

FIG. 14 is a diagram for explaining a detailed example of operations of the UE #1, the UE #2, and the eNB #2 according to the present embodiment.

As illustrated in FIG. 14, the UE #1 feeds back BC-PMI "1" to the eNB #2. Furthermore, in a precoder matrix indicated by the BC-PMI "1", a weight corresponding to the antenna port AP #0 of the eNB #2 is "½", a weight corresponding to the antenna port AP #1 is "j/2", a weight corresponding to the antenna port AP #2 is "−½", and a weight corresponding to the antenna port AP #3 is "−j/2".

When feeding back the BC-PMI to the eNB #2, the UE #1 notifies the eNB #2 of NAPI indicating an antenna port AP with low degree of contribution. In the example of FIG. 14, the NAPI indicates that the degree of contribution of the antenna ports AP #2 and AP #3 is low (not necessary).

Meanwhile, for the UE #2, when using a precoder matrix (PM) in which the weight corresponding to the antenna port AP #0 is "½", the weight corresponding to the antenna port AP #1 is "j/2", the weight corresponding to the antenna port AP #2 is "½", and the weight corresponding to the antenna port AP #3 is "j/2", it is assumed that a beam can be directed toward the UE #2.

In the precoder matrix indicated by the BC-PMI fed back from the UE #1, the eNB #2 designates a weight corresponding to the antenna port AP #1 indicated by the NAPI notified from the UE #1. Furthermore, based on PMI fed back from the UE #2, the eNB #2 changes the designated weight such that a beam is directed toward the UE #1 or a null is not directed toward the UE #1. In the example of FIG. 14, the eNB #2 changes the weight corresponding to the antenna port AP #2 from "−½" to "½" while changing the weight corresponding to the antenna port AP #3 from "−j/2" to "j/2". Then, the eNB #2 determines to apply a precoder matrix (PM) including the changed weight to transmission of a downlink signal to the UE #2.

In the present embodiment, it is preferred that PMI corresponding to a precoder matrix after the change has been defined. In the example of FIG. 14, the eNB #2 selects PMI "9" corresponding to a precoder matrix before the change as TPMI to be notified to the UE #2. Then, the eNB #2 transmits a downlink signal to the UE #2 using the determined precoder matrix (after the change), and notifies the UE #2 of the selected TPMI.

Figure 15:
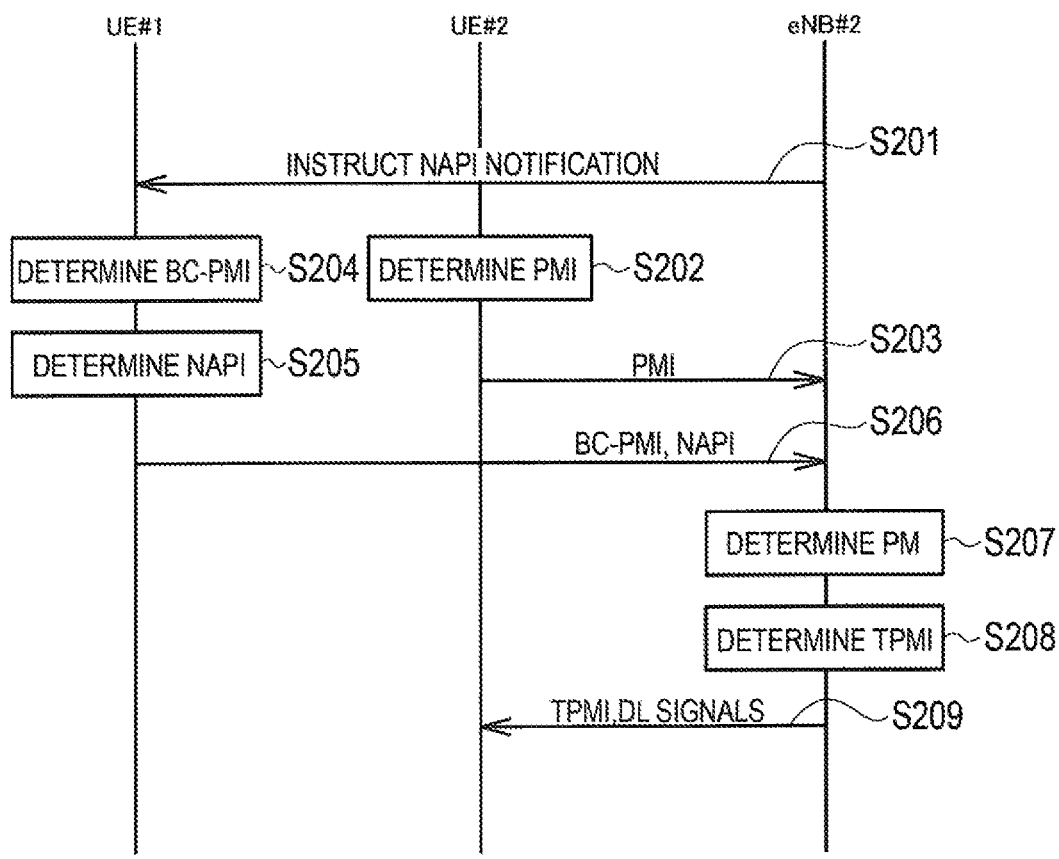
FIG. 15 is a sequence diagram illustrating a detailed example of an operation sequence of the eNB and the UE according to the third embodiment.

FIG. 15 is a sequence diagram illustrating a detailed example of an operation sequence of the UE #1, the UE #2, and the eNB #2 according to the present embodiment.

As illustrated in FIG. 15, in step S201, the eNB #2 (or the eNB #1) instructs the UE #1 to start to notify NAPI based on the start of CB-COMP.

In step S202, the UE #2 determines PMI to be fed back to the eNB #2.

In step S203, the UE #2 feeds back the determined PMI to the eNB #2.

Meanwhile, in step S204, the UE #1 determines BC-PMI to be fed back to the eNB #2.

In step S205, the UE #1 selects an antenna port AP with low degree of contribution at the time of transmission from the eNB #2, and determines NAPI to be notified to the eNB #2.

In step S206, the UE #1 feeds back the determined BC-PMI to the eNB #2, and notifies the eNB #2 of the determined NAPI. The BC-PMI and the NAPI may be directly fed back from the UE #1 to the eNB #2, or may be indirectly fed back from the UE #1 to the eNB #2 via the eNB #1.

In step S207, the eNB #2 determines a precoder matrix (PM) to be applied to transmission of a downlink signal to the UE #2, based on the BC-PMI and the NAPI from the UE #1 and the PMI from the UE #2.

In step S208, the eNB #2 determines TPMI to be notified to the UE #2, based on the precoder matrix (PM) to be applied to the transmission to the UE #2.

In step S209, the eNB #2 notifies the UE #2 of the determined TPMI, and transmits a downlink signal using the determined precoder matrix (PM).

(Conclusion)

As described above, when feeding back, to the eNB #2 (an adjacent cell), BC-PMI indicating a precoder matrix in which a null is directed toward the UE #1, the UE #1 notifies the eNB #2 of NAPI indicating an antenna port AP with low degree of contribution at the time of transmission from the eNB #2. In this way, the eNB #2 is able to recognize the antenna port AP with low degree of contribution at the time of transmission. Thus, the eNB #2 is able to change the weight, which corresponds to the antenna port AP with low degree of contribution in a precoder matrix that is used in the transmission of a downlink signal, for the sake of the UE #2. Consequently, the eNB #2 is able to appropriately direct a beam toward the UE #2 while appropriately directing a null toward the UE #1.

In the present embodiment, when the CB-COMP is performed, the eNB #2 (or the eNB #1) instructs notification of the NAPI. In this way, since the NAPI is notified in the case in which the notification of the NAPI is necessary, but the NAPI is not notified in the case in which the notification of the NAPI is not necessary, it is possible to suppress an increase in overhead.

In the present embodiment, the UE #1 selects the antenna port AP with low degree of contribution based on RSRP of each reference signal that is received by the UE #1 from each antenna port AP of the eNB #2. In this way, it is possible to appropriately select the antenna port AP with low degree of contribution at the time of transmission from the APs of the eNB #2.

Fourth Embodiment

Hereinafter, a fourth embodiment will be described.

In the aforementioned third embodiment, in the CB-COMP, when feeding back, to the eNB #2 (the adjacent cell), precoder matrix information indicating the precoder matrix in which a null is directed toward the UE #1, the UE #1 notifies the eNB #2 of the NAPI indicating the antenna port AP with low degree of contribution at the time of transmission from the eNB #2.

On the other hand, in the present embodiment, in the CB-COMP, the UE #1 feeds back plural pieces of precoder matrix information to the eNB #2 (the adjacent cell) with respect to one frequency band that is used in the transmission from the eNB #2. Specifically, the UE #1 feeds back the most preferred n (n≥2) pieces of precoder matrix information (BC-PMI) to be used in the downlink to the eNB #2.

The present embodiment is equal to FIG. 12 and FIG. 13 in terms of the operation environments of the eNB and the UE. However, by the following operation, both excellent beamforming and excellent null steering are performed in the CB-COMP.

(Operation of eNB and UE)

Firstly, the UE #1 feeds back, to the eNB #2, the most preferred n (n≥2) BC-PMIs to be used in the downlink with respect to one frequency band that is used in the transmission of a downlink signal. That is, the UE #1 feeds back n BC-PMIs, which are the least affected by interference given from the eNB to the UE #1, from among a plurality of previously defined PMIs.

In addition, when no CB-COMP is performed, the UE #1 may not feed back the BC-PMI. For example, when the CB-COMP is performed, the eNB #2 (or the eNB #1) may instruct the UE #1, which is an object of the CB-COMP, to feed back the n BC-PMIs with respect to one frequency band.

Secondly, based on PMI fed back from the UE #2, the eNB #2 selects one BC-PMI, in which a beam is directed toward the UE #2, from the n BC-PMIs fed back from the UE #1. That is, the eNB #2 designates another UE (here, the UE #2) that feeds back PMI coinciding with one of the n BC-PMIs fed back from the UE #1, and assigns, to the UE #2, a radio resource (a time and frequency resource) equal to that assigned to the UE #1. In addition, it is assumed that the eNB #2 shares scheduling information of the UE #1 with the eNB #1 dynamically or quasi-statically.

Then, the eNB #2 applies a precoder matrix indicated by the selected BC-PMI to transmission of a downlink signal to the UE #2. In addition, one PMI or a plurality of PMIs may be fed back from the UE #2.

According to such a method, one BC-PMI is selected from the most preferred n BC-PMIs to be used in the downlink inconsideration of the UE #2, so that it is possible to perform beamforming to the UE #2 while minimizing an adverse influence on null steering for the UE #1.

Figure 16:
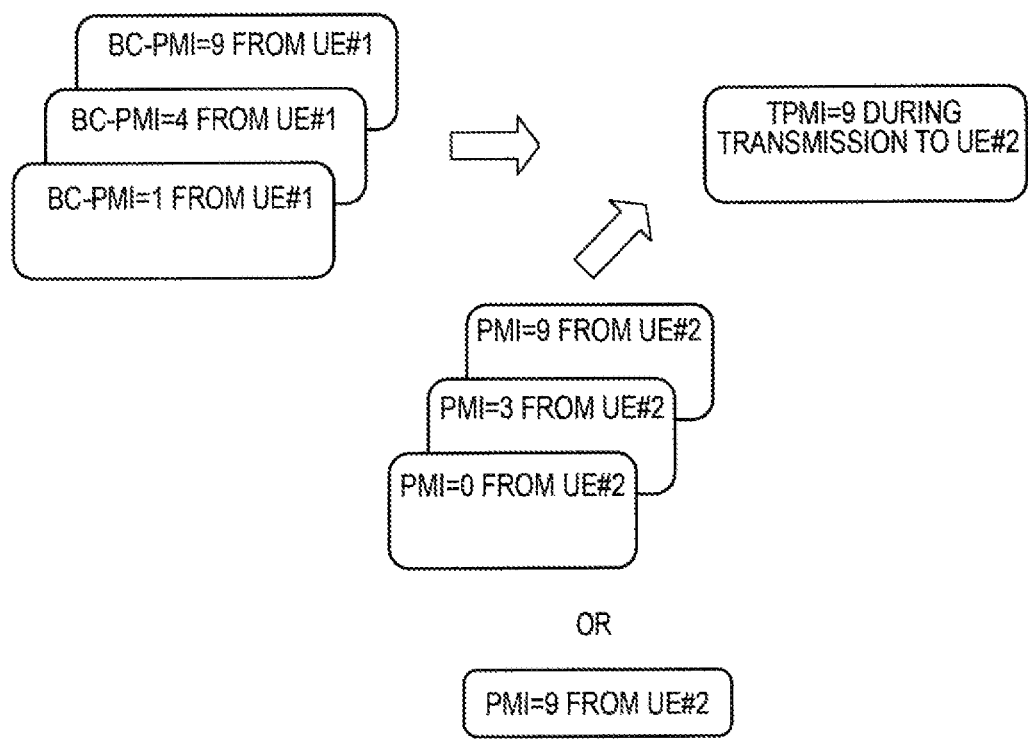
FIG. 16 is a diagram for explaining a detailed example of operations of the eNB and the UE according to the fourth embodiment.

FIG. 16 is a diagram for explaining a detailed example of operations of the UE #1, the UE #2, and the eNB #2 according to the present embodiment.

As illustrated in FIG. 16, the UE #1 feeds back the most preferred three BC-PMIs to the eNB #2. For example, the three BC-PMIs are BC-PMI "1", BC-PMI "4", and BC-PMI "9" in order from the most preferred.

Meanwhile, the UE #2 feeds back the most preferred three PMIs to the eNB #2. For example, the three PMIs are BC-PMI "0", BC-PMI "3", and BC-PMI "9" in order from the most preferred. Alternatively, the UE #2 may feed back the most preferred one PMI to the eNB #2.

Based on one BC-PMI or three BC-PMIs fed back from the UE #2, the eNB #2 selects one PMI (BC-PMI) from the three BC-PMIs fed back from the UE #1 such that a beam is directed toward the UE #2 or a null is not directed toward the UE #2. In the example of FIG. 16, the eNB #2 selects the PMI (BC-PMI) "9". Then, the eNB #2 determines to apply a precoder matrix (PM) indicated by the selected PMI (BC-PMI) "9" to transmission of a downlink signal to the UE #2.

Then, the eNB #2 transmits a downlink signal to the UE #2 using the determined precoder matrix, and notifies the UE #2 of TPMI corresponding to the selected PMI (BC-PMI) "9".

Figure 17:
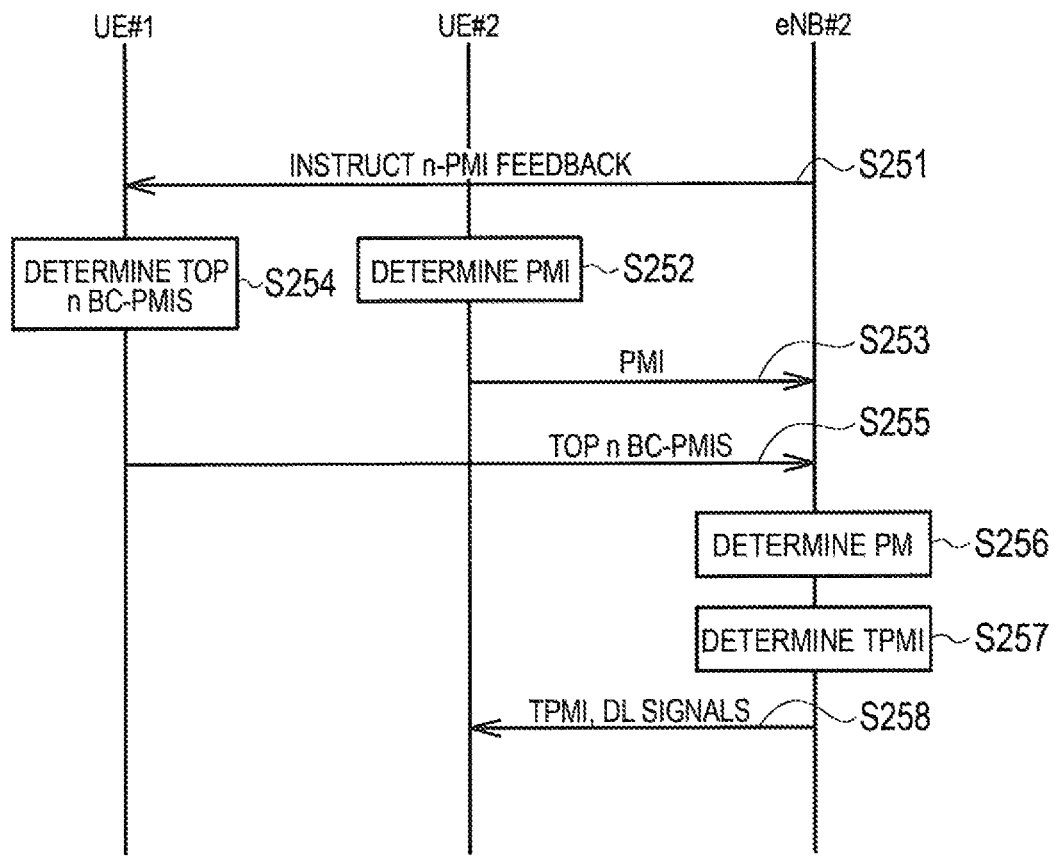
FIG. 17 is a sequence diagram illustrating a detailed example of an operation sequence of the eNB and the UE according to the fourth embodiment.

FIG. 17 is a sequence diagram illustrating a detailed example of an operation sequence of the UE #1, the UE #2, and the eNB #2 according to the present embodiment.

As illustrated in FIG. 17, in step S251, the eNB #2 (or the eNB #1) instructs the UE #1 to start to feedback the most preferred n BC-PMIs with respect to one frequency band. Furthermore, the eNB #2 may instruct the UE #2 to start to feed back the most preferred n PMIs with respect to one frequency band.

In step S252, the UE #2 determines one PMI or n PMIs to be fed back to the eNB #2.

In step S253, the UE #2 feeds back the determined PMI to the eNB #2.

Meanwhile, in step S254, the UE #1 determines the most preferred n BC-PMIs, which is to be fed back to the eNB #2.

In step S255, the UE #1 feeds back the determined n BC-PMIs to the eNB #2. The n BC-PMIs may be directly fed back from the UE #1 to the eNB #2, or may be indirectly fed back from the UE #1 to the eNB #2 via the eNB #1.

In step S256, the eNB #2 determines a precoder matrix (PM) to be applied to transmission to the UE #2 among the n BC-PMIs from the UE #1 based on the PMI from the UE #2 such that a beam is directed toward the UE #2 or a null is not directed toward the UE #2.

In step S257, the eNB #2 determines TPMI to be notified to the UE #2, based on the precoder matrix (PM) to be applied to the transmission to the UE #2.

In step S258, the eNB #2 notifies the UE #2 of the determined TPMI, and transmits a downlink signal using the determined precoder matrix (PM).

(Conclusion)

As described above, the UE #1 feeds back a plurality of BC-PMIs to the eNB #2 with respect to one frequency band that is used in transmission from the eNB #2. In this way, the eNB #2 is able to recognize the plurality of BC-PMIs available for the transmission of a downlink signal. Thus, the eNB #2 is able to select one of the plurality of BC-PMIs while considering the UE #2. Consequently, the eNB #2 is able to appropriately direct a beam toward the UE #2 while appropriately directing a null toward the UE #1.

In the present embodiment, the plurality of BC-PMIs are the most preferred n (n≥2) BC-PMIs to be used in the downlink. In this way, the eNB #2 is able to appropriately direct a null toward the UE #1.

In the present embodiment, when the CB-COMP is performed, the eNB #2 directs a value of n. In this way, since the n BC-PMIs are notified in the case in which the notification of the n BC-PMIs is necessary, but the n BC-PMIs are not notified in the case in which the notification of the n BC-PMIs is not necessary, it is possible to suppress an increase in overhead.

Modification of Fourth Embodiment

In the aforementioned fourth embodiment, the UE #1 feeds back n (n≥2) BC-PMIs to the eNB #2 (an adjacent cell).

On the other hand, in the present modification, the UE #1 feeds back n (n≥2) WC-PMIs to the eNB #2 (the adjacent cell). That is, the UE #1 feeds back n WC-PMIs, which are the most affected by interference given from the eNB to the UE #1, from among a plurality of previously defined PMIs.

The eNB #2 uses the fed-back n WC-PMIs as reference information when selecting UE in its own cell, which is to be spatially multiplexed with the UE #1.

The present embodiment is equal to FIG. 12 and FIG. 13 in terms of the operation environments of the eNB and the UE. However, by the following operation, both excellent beamforming and excellent null steering are performed in the CB-COMP.

Firstly, the UE #1 selects n (n≥2) WC-PMIs with respect to one frequency band (for example, each sub-band) that is used in transmission from the eNB #2, and feeds back the n WC-PMIs to the eNB #2.

In addition, when no spatial multiplexing (CB-COMP) is performed, the UE #1 may not feed back the WC-PMI. For example, when the spatial multiplexing is performed, the eNB #2 (the eNB #1) may instruct each UE, which is an object of the spatial multiplexing, to feed back the n WC-PMIs with respect to one frequency band.

Secondly, the eNB #2 designates another UE (for example, the UE #2) that feeds back PMI (inconsistent PMI) not coinciding with the n WC-PMIs fed back from the UE #1. Furthermore, the eNB #2 assigns, to the other UE, a radio resource (a time and frequency resource) equal to that assigned to the UE #1. Then, the eNB #2 applies a precoder matrix indicated by the inconsistent PMI to transmission to the other UE.

According to such a method, unpreferred PMI (WC-PMI) is not applied to the UE #1, so that it is possible to prevent a beam from being directed toward the UE #1. Furthermore, the value of n is set to be large, so that the probability of presence of the other UE for feeding back the inconsistent PMI is low, but it is possible to increase the probability that a null is directed toward the UE #1. Meanwhile, preferred PMI is applied to the other UE (for example, the UE #2), so that it is possible to allow a beam to be directed toward the other UE.

OTHER EMBODIMENTS

Thus, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

For example, the aforementioned first embodiment to fourth embodiment can be performed separately and independently, and can be performed through a combination thereof. For example, the present invention can be applied to an operation environment in which both MU-MIMO and CB-COMP are used.

This application claims the benefit of priority from U.S. Provisional Application No. 61/604,673 (filed on Feb. 29, 2012) and U.S. Provisional Application No. 61/713,783 (filed on Oct. 15, 2012), the entire contents of which are incorporated herein by reference.

INDUSTRIAL APPLICABILITY

As described, the present invention is useful in mobile communication fields.

The invention claimed is:

1. A communication control method, which is applied to a mobile communication system including a base station and a user terminal, the communication control method comprising:
receiving, by the user terminal, a downlink reference signal transmitted from the base station, the base station transmitting the downlink reference signal through a plurality of antenna ports;
transmitting, by the user terminal, precoder matrix information, antenna port information, and channel quality information to the base station, wherein
the precoder matrix information indicates a precoder matrix preferred to be used in a downlink,
the antenna port information indicates an antenna port with low degree of contribution, the antenna port with low degree of contribution being an antenna port amongst the plurality of antenna ports, wherein a received power of the downlink reference signal associated with the antenna port with low degree of contribution, measured by the user terminal, is low in comparison with received powers associated with other antenna ports of the plurality of antenna ports, and
the channel quality information indicates a modulation scheme and coding rate preferred to be used in the downlink, the channel quality information being corrected in correspondence with an anticipated quality deterioration related to the antenna port with low degree of contribution.

2. The communication control method according to claim 1, further comprising:
instructing, by the base station, the user terminal to transmit the antenna port information and
in the transmitting, transmitting, by the user terminal, the antenna port information based on the instruction from the base station.

3. The communication control method according to claim 1, wherein a number of antenna ports selectable as the antenna port with low degree of contribution is determined based on a number of antenna ports of the base station.

4. The communication control method according to claim 1, wherein the antenna port with low degree of contribution is determined based on received power of each downlink reference signal that is received by the user terminal from the base station for each of the plurality of antenna ports.

5. The communication control method according to claim 1, further comprising:
notifying, by the base station, the user terminal of transmission precoder matrix information indicating a precoder matrix used when the base station transmits a downlink signal, wherein
in the notifying, the transmission precoder matrix information to be transmitted to the user terminal is determined on the basis of the precoder matrix information received at the base station from the user terminal.

6. The communication control method according to claim 1, wherein the preferred precoder matrix is for configuring a beam to be directed toward the user terminal.

7. The communication control method according to claim 1, wherein the preferred precoder matrix is for configuring a null to be directed toward the user terminal.

8. A user terminal, comprising:
a receiver configured to receive a downlink reference signal transmitted from a base station, the base station transmitting the downlink reference signal through a plurality of antenna ports;
a transmitter configured to transmit precoder matrix information, antenna port information, and channel quality information to the base station, wherein
the precoder matrix information indicates a precoder matrix preferred to be used in a downlink,
the antenna port information indicates an antenna port with low degree of contribution, the antenna port with low degree of contribution being an antenna port amongst the plurality of antenna ports, wherein a received power of the downlink reference signal associated with the antenna port with low degree of contribution, measured by the user terminal, is low in comparison with received powers associated with other antenna ports of the plurality of antenna ports, and
the channel quality information indicates a modulation scheme and coding rate preferred to be used in the downlink, the channel quality information being corrected in correspondence with an anticipated quality deterioration related to the antenna port with low degree of contribution.

9. A base station, comprising:
a transmitter configured to transmit a downlink reference signal to a user terminal through a plurality of antenna ports,
a receiver configured to receive precoder matrix information, antenna port information, and channel quality information from the user terminal, wherein
the precoder matrix information indicates a precoder matrix preferred to be used in a downlink,
the antenna port information indicates an antenna port with low degree of contribution, the antenna port with low degree of contribution being an antenna port amongst the plurality of antenna ports, wherein a received power of the downlink reference signal associated with the antenna port with low degree of contribution, measured by the user terminal, is low in comparison with received powers associated with other antenna ports of the plurality of antenna ports, and
the channel quality information indicates a modulation scheme and coding rate preferred to be used in the downlink, the channel quality information being corrected in correspondence with an anticipated quality deterioration related to the antenna port with low degree of contribution.

10. A mobile communication system comprising:
a base station that performs downlink transmission by applying a precoder matrix for determining downlink transmission directionality; and
a user terminal that feeds back plural pieces of precoder matrix information corresponding to one frequency band to the base station, wherein
the user terminal further feeds back channel quality information to the base station, the channel quality information indicating a modulation scheme and coding rate preferred to be used in a downlink, and
the channel quality information is determined based on a precoder matrix information which is not preferred among the plural pieces of precoder matrix information.

11. The mobile communication system according to claim 10, wherein
the base station uses each of the plural pieces of precoder matrix information to determine a precoder matrix to be applied to downlink transmission to the user terminal, and wherein
each of the plural pieces of precoder matrix information indicates a precoder matrix preferred to the user terminal.

12. The mobile communication system according to claim 11, wherein the precoder matrix preferred to the user terminal is for configuring a beam to be directed toward the user terminal.

13. The mobile communication system according to claim 11, wherein the plural pieces of precoder matrix information includes the most preferred n (n≥2) pieces of precoder matrix information.

14. The mobile communication system according to claim 13, wherein a value of the n is directed from the base station.

15. The mobile communication system according to claim 10, wherein
the base station uses each of the plural pieces of precoder matrix information to determine a precoder matrix to be applied to downlink transmission to a different user terminal from the user terminal, and wherein
each of the plural pieces of precoder matrix information indicates a precoder matrix preferred to the user terminal.

16. The mobile communication system according to claim 15, wherein the precoder matrix preferred to the user terminal is for configuring a null to be directed toward the user terminal.

17. The mobile communication system according to claim 15, wherein the plural pieces of precoder matrix information includes the most preferred n (n≥2) pieces of precoder matrix information.

18. The mobile communication system according to claim 17, wherein a value of the n is directed from the base station.

19. The mobile communication system according to claim 10, wherein
the base station uses each of the plural pieces of precoder matrix information to determine a precoder matrix to be applied to downlink transmission to a different user terminal from the user terminal, and wherein
each of the plural pieces of precoder matrix information indicates a precoder matrix not preferred to the user terminal.

20. The mobile communication system according to claim 19, wherein the precoder matrix not preferred to the user terminal is for configuring a beam to be directed toward the user terminal.

21. The mobile communication system according to claim 19, wherein the plural pieces of precoder matrix information includes the least preferred n (n≥2) pieces of precoder matrix information.

22. The mobile communication system according to claim 21, wherein a value of the n is directed from the base station.

23. The mobile communication system according to claim 10, wherein the base station configures a serving cell of the user terminal or a cell adjacent to the serving cell.

24. A user terminal in a mobile communication system, comprising:
a receiver configured to receive a radio signal from a base station; and
a transmitter configured to feed back plural pieces of precoder matrix information corresponding to one frequency band to the base station, the base station performing downlink transmission by applying a precoder matrix for determining downlink transmission directionality, wherein
the transmitter is further configured to feed back channel quality information to the base station, the channel quality information indicating a modulation scheme and coding rate preferred to be used in a downlink, and
the channel quality information is determined based on a precoder matrix information which is not preferred among the plural pieces of precoder matrix information.

25. A base station, in a mobile communication system, comprising:
a controller configured to perform downlink transmission by applying a precoder matrix for determining downlink transmission directionality;
a transmitter configured to transmit a radio signal to a user terminal; and
a receiver configured to receive, plural pieces of precoder matrix information corresponding to one frequency band, which is fed back from the user terminal, wherein
the receiver is further configured to receive channel quality information fed back from the user terminal, the channel quality information indicating a modulation scheme and coding rate preferred, by the user terminal, to be used in a downlink, and
the channel quality information is determined based on a precoder matrix information which is not preferred by the user terminal, among the plural pieces of precoder matrix information.

* * * * *